United States Patent
Hewitt et al.

(10) Patent No.: US 8,151,364 B2
(45) Date of Patent: Apr. 3, 2012

(54) AUTHENTICATION DEVICE AND/OR METHOD

(75) Inventors: Simon Charles Hughes Hewitt, Templestowe (AU); Jason Frederick Bender, Glen Osmond (AU); James Evan Lenon, Brompton (AU)

(73) Assignee: eMue Holdings Pty Ltd, Melbourne, Victoria (AU)

( * ) Notice: Subject to any disclaimer, the term of this patent is extended or adjusted under 35 U.S.C. 154(b) by 1229 days.

(21) Appl. No.: 11/544,378

(22) Filed: Oct. 6, 2006

(65) Prior Publication Data

US 2007/0088952 A1    Apr. 19, 2007

(30) Foreign Application Priority Data

Dec. 21, 2004  (AU) .......................................... 735603
Dec. 21, 2005  (WO) ................ PCT/AU2005/001923

(51) Int. Cl.
G06F 21/24    (2006.01)
H04L 29/06    (2006.01)
H04L 9/12     (2006.01)

(52) U.S. Cl. ........................................ 726/30; 713/168
(58) Field of Classification Search ........................ None
See application file for complete search history.

(56) References Cited

U.S. PATENT DOCUMENTS

| | | | |
|---|---|---|---|
| 4,344,177 A | 8/1982 | Kustka | |
| 4,796,220 A | 1/1989 | Wolfe | |
| 5,291,598 A | 3/1994 | Grundy | |
| 5,438,622 A * | 8/1995 | Normile et al. | 380/46 |
| 5,751,595 A * | 5/1998 | Beatty et al. | 716/106 |
| 6,205,437 B1 | 3/2001 | Gifford | |
| 6,380,969 B1 | 4/2002 | Limberg | |
| 6,460,140 B1 | 10/2002 | Schoch et al. | |
| 6,532,290 B1 | 3/2003 | Dent | |
| 6,535,553 B1 | 3/2003 | Limberg et al. | |
| 6,560,581 B1 | 5/2003 | Fox et al. | |

(Continued)

FOREIGN PATENT DOCUMENTS

GB    2344496    6/2000

(Continued)

OTHER PUBLICATIONS

Riera-Palou et al. "Segmented equalizers with dynamic length selection," Conference Record of the Thirty-Fifth Asilomar Conference on Signals, Systems and Computers, 2001 2:951-955 (Nov. 2001).

(Continued)

*Primary Examiner* — Christopher Revak
(74) *Attorney, Agent, or Firm* — Kilpatrick Townsend and Stockton LLP

(57) ABSTRACT

A method of authenticating a remote service (104) to a user (102) via a communications network (106) is disclosed. The remote service (104) obtains a service authentication code that has been generated, using a code generation algorithm, based on a first secret key. The service authentication code is communicated to the user (102) via the communications network (106) and received, or entered, into an authentication device (106) associated with the user (102). The authentication device (106) then generates, using the same code generation algorithm, an expected code value based on a second secret key and compares the expected code value to the service authentication code. Responsive to the comparison, and in the event that the expected code value correlates with the service authentication code, the authentication device (106) generates a response that indicates to the user (102) the authenticity of the remote service (104).

36 Claims, 9 Drawing Sheets

U.S. PATENT DOCUMENTS

| | | |
|---|---|---|
| 6,763,076 B1 | 7/2004 | Glavieux |
| 6,799,272 B1 | 9/2004 | Urata |
| 6,847,948 B1 | 1/2005 | Paolini et al. |
| 6,889,324 B1* | 5/2005 | Kanai et al. ............... 713/176 |
| 7,222,238 B2* | 5/2007 | Bleumer et al. ........... 713/177 |
| 2001/0043650 A1 | 11/2001 | Sommer et al. |
| 2002/0073345 A1* | 6/2002 | Esfahani .................. 713/202 |
| 2003/0072363 A1 | 4/2003 | McDonald et al. |
| 2003/0182551 A1* | 9/2003 | Frantz et al. ............. 713/170 |
| 2004/0039919 A1 | 2/2004 | Takayama et al. |
| 2004/0111610 A1* | 6/2004 | Slick et al. ............... 713/160 |
| 2004/0243845 A1* | 12/2004 | Larsen ..................... 713/201 |
| 2005/0280742 A1 | 12/2005 | Jaffe |
| 2011/0138176 A1* | 6/2011 | Mansour .................. 713/168 |
| 2011/0138454 A1* | 6/2011 | Mansour .................... 726/9 |
| 2011/0258447 A1* | 10/2011 | Wei et al. ................. 713/168 |

FOREIGN PATENT DOCUMENTS

| | | |
|---|---|---|
| GB | 2369469 A | 5/2002 |
| GB | 2387999 A | 10/2003 |
| WO | WO9959331 | 11/1999 |
| WO | WO00/56009 A1 | 9/2000 |
| WO | WO01/31840 A1 | 5/2001 |
| WO | WO02/079960 A1 | 10/2002 |

OTHER PUBLICATIONS

"Sheriff" product information from sheriff-software.com, Licensing Technologies Limited, Beaconsfield, Buckinghamshire England (2006).

M'Raihi et al. "HOTP: An HMAC-Based One-Time Password Algorithm," internet draft submitted to the Internet Engineering Task Force (Oct. 21, 2004).

* cited by examiner

| ESDS | 06 | 16 | 09 | 13 | 01 | 03 | 19 | 12 | 18 | 14 | 05 | 08 | 07 | 10 | 02 | 17 | 20 | 11 | 15 | 04 |
|---|---|---|---|---|---|---|---|---|---|---|---|---|---|---|---|---|---|---|---|---|
| POSITION | 1 | 2 | 3 | 4 | 5 | 6 | 7 | 8 | 9 | 10 | 11 | 12 | 13 | 14 | 15 | 16 | 17 | 18 | 19 | 20 |
| DES | 7 | 3 | 6 | 1 | 9 | 4 | 8 | 2 | 6 | 4 | 0 | 1 | 9 | 4 | 8 | 2 | 7 | 3 | 5 | 1 |
| DISPLACED DES | 9 | 8 | 4 | 1 | 0 | 7 | 9 | 1 | 6 | 4 | 3 | 2 | 1 | 4 | 5 | 3 | 2 | 6 | 8 | 7 |
| UES | A | 2 | 3 | C | T | B | L | M | 4 | S | 5 | R | T | 7 | P | 6 | S | J | K | 9 |
| DISPLACED UES | T | P | B | 9 | 5 | A | T | R | 3 | 7 | J | M | C | S | K | 2 | 6 | 4 | L | S |

FIGURE 5

| POSITION | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1ST DISPLACED DES | 9 | 8 | 4 | 1 | 0 | 7 | 9 | 1 | 6 | 4 | 3 | 2 | 1 | 4 | 5 | 3 | 2 | 6 | 8 | 7 |
| FINAL DISPLACED DES | 5 | 3 | 2 | 6 | 8 | 7 | 9 | 8 | 4 | 1 | 0 | 7 | 9 | 1 | 6 | 4 | 3 | 2 | 1 | 4 |
| 1ST DISPLACED UES | T | P | B | 9 | 5 | A | T | R | 3 | 7 | J | M | C | S | K | 2 | 6 | 4 | L | S |
| FINAL DISPLACED UES | K | 2 | 6 | 4 | L | S | T | P | B | 9 | 5 | A | T | R | 3 | 7 | J | M | C | S |

FIGURE 6

AUTHENTICATION DEVICE AND/OR METHOD

This application claims priority from Australian Provisional Patent Application No. 2004907210 filed on 21 Dec. 2004, the contents of which are to be taken as incorporated herein by this reference.

FIELD OF INVENTION

The present invention relates to a method of, and device for, authenticating a remote service to a user. In a typical application, the authentication method or device may be used to authenticate a remote service, such as a web-site, to a user operating a workstation connected to a communications network. However, the authentication device or method may also be used to authenticate a user to the remote service, or indeed, mutually authenticate a remote service and a user.

BACKGROUND OF THE INVENTION

Conventional authentication methods and devices typically allow authentication of a user to a remote service. Typically, conventional authentication methods entail a remote service authenticating a user simply by requesting a password from the user.

Consequently, the user has no way to know whether he or she is really communicating with the desired or correct remote service. Thus, if a remote computer is able to mimic the behaviour of the remote service, the user may be spoofed or "phished" into thinking that he or she is communicating with the correct remote service. As a result, an unsuspecting user may divulge information that they would otherwise only divulge to a legitimate remote service, such as, for example, their user ID and password.

Accordingly, it is an object of the present invention to provide an authentication device and/or method that is suitable for at least authenticating a remote service to a user.

The discussion of the background to the invention herein is included to explain the context of the invention. This is not be taken as an admission that any of the material referred was published, known or part of the common general knowledge as at the priority date of this application.

SUMMARY OF THE INVENTION

The present invention provides a method of authenticating a remote service to a user via a communications network, the method including:

the remote service obtaining a service authentication code that has been generated, using a code generation algorithm, based on a first secret key;

communicating the service authentication code to the user via the communications network;

receiving or entering the service authentication code into an authentication device associated with the user;

the authentication device generating, using the same code generation algorithm, an expected code value based on a second secret key and thereafter comparing the expected code value to the service authentication code; and responsive to the comparison, and in the event that the expected code value correlates with the service authentication code, the authentication device generating a response that indicates, to the user, the authenticity of the remote service.

For the authentication device to generate a response that indicates, to the user, that the remote service is authentic, the first secret key must be the same as the second secret key. If the first secret key is different to the second secret key, the expected code value will be different to the service authentication code and thus the authentication device will not authenticate the remote service.

In an embodiment, the remote service obtains a service authentication code from an authentication server that has generated the service authentication code based on a first secret key retrieved from a database in response to a request from a user. In an embodiment, the request includes a message containing a code (hereinafter, the "activation code") that identifies the authentication device associated with the user. According to that embodiment, the authentication server retrieves a first secret key associated with the code from a database containing codes for each authentication device that has been registered for accessing the remote service.

In another embodiment, the obtaining of the service authentication code by the remote service includes the remote service redirecting a user accessing the remote service to an authentication service hosted by the authentication server, and the authentication service providing the service authentication code to the user.

In an embodiment, the second secret key is a secret key that is uniquely associated with the authentication device.

The types of remote services that may be authenticated will vary. Typically, the remote service will include an electronic commerce service. As will be appreciated, an electronic commerce service is a remote service that uses programmed computers and communications technologies to enable the purchase and sale of goods and services. In an embodiment, a remote service may include an electronic commerce "web-based" service for conducting financial transactions (for example a web-based banking service), user account management services (such as a telephone account management service), a share trading service, a reservation service, an order processing service, an inventory management service, an on-line auction service, an on-line shopping service, an electronic messaging service.

In terms of suitable communications technology, suitable communications networks may include a network supporting data packet based communications (such as a TCP/IP local area network, or the internet), a wireless-application protocol (WAP) network, a telephone network (such as, a public switched telephone network) or other suitable communications network. As will be appreciated, the foregoing examples of remote services and communications networks are exemplary only and are not to be construed as limiting. In addition, and as will be appreciated, the actual communication network will depend on the type of the remote service and the required interconnectivity between that service and the user in order for the user to access that service. For example, in an embodiment where the remote service is a web-based service that is accessible to a user by way of a client workstation, the communications network may be the Internet.

In an embodiment, the code generation algorithm for generating the service authentication code is hosted by the remote service. However, in an alternative embodiment the code generation algorithm is hosted by an authentication server that is remote from the remote service but accessible thereto to generate the service authentication code in response to a request from the remote service. In such an embodiment, the authentication server provides the service authentication code to the remote service after it has been generated.

In an embodiment, the generation of the service authentication code entails encoding the first secret key to provide the service authentication code. The encoding of the first secret key to provide the authentication code may be performed using any suitable code generation algorithm. One suitable code generation algorithm encodes the first secret key using a first pseudorandom encoding sequence and a second pseudorandom encoding sequence having the same sequence length as the first pseudorandom encoding sequence. According to that embodiment, different first and second pseudorandom encoding sequences are employed by the code generation algorithm each time a service authentication code is generated.

In an embodiment, the first pseudorandom encoding sequence includes a sequence of singularly occurring characters (such as, for example, alphabetical, numerical and/or alphanumerical characters) forming a character set that includes the characters of the first secret key. That is, in one embodiment the first secret key is derived from the same character set that is used to form the first pseudorandom encoding sequence. In this respect, reference to the term "character set" throughout this specification is to be understood to be a reference to a character set that includes numerical characters, or alphanumerical characters, or alphabetic characters. In addition, reference to the term "singularly occurring" is to be understood to be a reference to a character set in which each character appears only once.

In an embodiment, the second pseudorandom encoding sequence includes an arrangement of characters from the same, or a different, character set to the first secret key. However, in an embodiment the second pseudorandom encoding sequence has the same sequence length as the first pseudorandom encoding sequence. In this respect, reference to the term "sequence length" throughout this specification is to be understood to refer to the number of characters in a sequence. Thus, an encoding sequence that includes ten characters will have a sequence length of ten.

Because the service authentication code and the expected code value are generated using the same code generation algorithm, each instance of the code generation algorithm employs the same first and a second pseudorandom encoding sequence to generate the service authentication code or the expected code value respectively.

In a code generation algorithm that employs a first and a second pseudorandom encoding sequence of the type described above, the encoding of the first secret key to generate the service authentication code may include:
  identifying, in order, the location of characters in the first pseudorandom encoding sequence corresponding to the characters of the first secret key;
  mapping the sequence location of the identified characters to characters of the second pseudorandom encoding sequence having the same sequence location to provide a set of characters from the second pseudorandom encoding sequence; and
  arranging, in the order of identification, the set of characters of the second pseudorandom encoding sequence to form the service authentication code.

In an embodiment, different first and second pseudorandom encoding sequences are used whenever a service authentication code is generated to reduce the likelihood of the same service authentication code being regenerated. Thus, in one embodiment, each service authentication code is effectively a one-time usable code.

The first and second pseudorandom encoding sequence used for a particular code generation event may be selected by the instance of the code generation algorithm providing the service authentication code to the remote service. In this respect, reference to the term "code generation event" throughout this specification is to be understood to be reference to a single iteration of the code generation algorithm.

In an embodiment, the first and second pseudorandom encoding sequences are selected from respective arrays of encoding sequences so that different first and second pseudorandom encoding sequences are selected each time a service authentication code is generated.

In an embodiment that includes respective arrays containing first and second pseudorandom encoding sequences as array elements, each array will support a finite number of code generation events. The number of code generation events will typically correspond to the number of array elements in that array. In one embodiment, after each sequence in an array has been used to generate a service authentication code, each character in each array element is controllably shifted to a different location within an array element to modify a respective encoding sequence.

As described previously, each instance of the code generation algorithm employs the same first and second pseudorandom encoding sequences for generating the service authentication code or the expected code value respectively. Thus, in an embodiment where the first and second pseudorandom encoding sequence used for a particular code generation event are selected by the code generation algorithm that generates the service authentication code, the method further includes:
  communicating an identifier to the user that identifies the first and second pseudorandom encoding sequence used to generate the service authentication code; and
  receiving or entering the identifier into the authentication device associated with the user for use by the code generation algorithm of the authentication device to identify the first and second pseudorandom encoding sequence to be used to generate the expected code value based on the second secret key.

The service authentication code will typically be communicated to the user using a communications protocol that is supported by the communications network. For example, for an Internet based remote service the communication may include a HTML file including a uniform resource locator (URL) that links the user to a web-page that provides the service authentication code. Alternatively, the service authentication code may be communicated by way of another messaging mechanism, such as an eMail message, a Short Message Service (SMS) text message, an aural message (for example, MP3 or WAV file based message) that recites the service authentication code, a video based message, a graphical message (for example, a jpeg file) or a multi-media messaging protocol that includes the service authentication code.

In an embodiment, the response generated by the authentication device to indicate the authenticity of the remote service to the user includes the authentication device providing a valid authentication signal to the user. Again, a valid authentication signal will only be generated if the first secret key and the second secret key are the same.

In another embodiment, the response generated by the authentication device to indicate the authenticity of the remote service to the user includes the authentication device activating for generating a user authentication code based on a third secret key.

In an embodiment, the third secret key is a secret key associated with the user, such as a user personal identification number (PIN). In an embodiment, the user authentication code is used for authenticating the user to the remote service.

In an embodiment that generates a user authentication code, based on a third secret key, for authenticating a user to a remote service, the authentication of the user will be conducted using the same code generation algorithm as previously described but will be based on a fourth secret key accessible to a user authentication service. In an embodiment, the user authentication service is provided by the remote service. However, in another embodiment the user authentication service is provided by an authentication server and the results of the user authentication are communicated to the remote service.

Thus, the present invention also provides a method of authenticating a user to a remote service via a communications network, the method including:

an authentication device generating, using a code generation algorithm, a user authentication code based on a third secret key;

communicating the service authentication code to the remote service via the communications network;

the remote service, or another service, obtaining an expected code value that has been generated based on a fourth secret key and thereafter comparing the expected code value to the user authentication code; and responsive to the comparison, and in the event that the expected code value correlates with the user authentication code, the remote service allowing the user further access to the remote service.

The present invention also provides a method of mutually authenticating a remote service user and a remote service via a communications network, the method including:

the remote service obtaining a service authentication code that has been generated, using a code generation algorithm, based on a first secret key;

communicating the service authentication code to the user via the communications network;

receiving or entering the service authentication code into an authentication device associated with the user;

the authentication device generating, using the same code generation algorithm, an expected code value based on a second secret key and thereafter comparing the expected code value to the service authentication code;

responsive to the comparison, and in the event that the expected code correlates with the service authentication code, the authentication device generating, using a code generation algorithm, a user authentication code value based on a third secret key;

communicating the user authentication code to the remote service via the communications network;

the remote service, or other service, obtaining an expected code value that has been generated based on a fourth secret key and thereafter comparing the expected code value to the user authentication code; and responsive to the comparison and in the event that the expected code correlates with the user authentication code, the remote service allowing the user further access to the remote service.

The present invention also provides a software architecture embodied on one or more computer-readable media for implementation on a server, the server software architecture including:

a service authentication code generator for generating a service authentication code, using a code generation algorithm, based on a first secret key, the generation of the service authentication code including encoding the first secret key using a first pseudorandom encoding sequence and a second pseudorandom encoding sequence having the same sequence length as the first pseudorandom encoding sequence, the encoding including:

identifying, in order, the location of characters in the first pseudorandom encoding sequence that correspond to the characters of the first secret key;

mapping the sequence location of the identified characters to characters of the second pseudorandom encoding sequence having the same sequence location so as to provide a set of characters from the second pseudorandom encoding sequence; and arranging, in the order of identification, the set of characters of the second pseudorandom encoding sequence so as to form the service authentication code; and a communication driver for communicating the service authentication code to a remote user via the communications network;

wherein the service authentication code varies according to the first and a second pseudorandom encoding sequences used by the code generation algorithm and wherein a different first and second pseudorandom encoding sequence is used whenever a service authentication code is generated so as to reduce the likelihood of the same service authentication code being regenerated.

The present invention also provides authentication device software architecture embodied on one or more computer-readable media for implementation on an authentication device, the authentication device software architecture including:

an input driver for receiving or entering a service authentication code provided by a remote service, the service authentication code having been generated using a code generation algorithm, based on a first secret key;

a generator for generating, using the code generation algorithm, an expected code value based on a second secret key;

a comparator for comparing the expected code value to the service authentication code; and a response generator for generating a response indicative of the authenticity of the remote service according to a comparison of the expected code with the service authentication code.

The present invention also provides an authentication device for providing a response that indicates, to a user of the authentication device, the authenticity of a remote service based on an service authentication code provided by the remote service, the authentication device including input means for receiving or entering the service authentication code, the service authentication code having been generated using a code generation algorithm, based on a first secret key;

generator means for generating, using the code generation algorithm, an expected code value based on a second secret key;

comparator means for comparing the expected code value to the service authentication code; and a response generator means for generating a response indicative of the authenticity of the remote service according to a comparison of the expected code with the service authentication code.

In an embodiment, the response generated by the authentication device to indicate the authenticity of the remote service to the user includes the authentication device activating for generating a user authentication code for authenticating the user to the remote service. In this embodiment, the user authentication code may be communicated to the remote service to allow the remote service to authenticate the user using the same code generation algorithm as described previously but based on a fourth secret key.

Thus, in this embodiment the present invention provides an authentication device that will only allow its operability if activated by a valid service authentication code provided by the remote service, or other entity, to which the authentication device will subsequently be used to authenticate the owner or user of the authentication device. This will ensure verification of the authenticity of the website, or entity, to which the user is authenticating, prior to requesting the user authenticate to the website or entity.

As a result, the ability to "phish" key information is significantly reduced, unlike with other devices currently entering the market, such as scratch cards and some electronic one-time passwords (OTPs), because the fraudulent website or entity looking to fool the user into divulging sensitive information would have a reduced likelihood of guessing, for example, a six digit authentication code, in order to demonstrate that they were the legitimate remote service or other entity to which the user would have thought they were dealing with. As will be appreciated, the longer the authentication codes, the less the likelihood of being guessed correctly.

Advantageously, an embodiment of the present invention that uses pseudorandom encoding sequences to encode the different secret keys moves away from numerical algorithms used in devices such as tokens, scratch cards and OTPs. Such devices are based on complex prime number related algorithms that, in time, may be subject to mathematical compromise.

In an embodiment, the authentication device may include, or be installed on, a portable device that is able to be held by the user. Another embodiment also includes an authentication server that interprets data sent between the remote service and the user so as to verify both the integrity of the remote service and that of the user.

It is envisaged that the present invention will find application in a variety of different applications. For example, the present invention may be applicable to control entry into buildings/restricted areas, online election voting (for example, for an electoral commission or corporate board meetings), logging onto a corporate network either internally, or from remote office locations/home, and authenticating that an email message has originated from a legitimate (as opposed to a fraudulent) source.

Advantageously, an embodiment of the invention that supports mutual authentication may be used by a user to authenticate the identity of, or other information relating to, another person (or entity) after having first verified that the user is communicating with a remote service that is able to legitimately authenticate that other person or entity.

Thus, in one embodiment, the present invention also provides a method of, and system for, verifying the identity and/or credentials of another person or entity. For example, the present invention may be used to verify that a tradesman (for example, an electrician) is suitably licensed, by participating in an authentication between the tradesman, the user and a remote service that is able to obtain licensing status information from a regulatory body (for example, the office of consumer and business affairs). By way of another example, and again in relation to an embodiment that supports mutual authentication, the present invention may be used to verify that a job applicant holds a degree from "university X". By way of yet another example, the present invention may be used as a part of a ticketing system for authenticating the identity of a traveler for ticketing purposes.

Thus, the present invention also provides a method of authenticating the identity and/or credentials of a second user to a first user using a remote service via a communications network, the method including:

the first user authenticating the remote service using the above described authentication method;

in the event that remote service is validly authenticated, the first user providing a user authentication code generated by an authentication device of the second user based on a secret key associated with, or provided by, the second user;

communicating the user authentication code to the remote service via the communications network;

the remote service obtaining an expected code value that has been generated based on a secret key and thereafter comparing the expected code value to the user authentication code for a second user; and responsive to the comparison and in the event that the expected code correlates with the user authentication code, the remote service providing a response to the first user that indicates the authenticity of the second user.

The present invention also provides a method of authenticating a remote service to a user via a communications network, the method including:

a user operating an authentication device to retrieve, from the device, a unique identification code associated therewith;

communicating the unique identification code to the remote service via a communications network;

the remote service obtaining a service authentication code that has been generated, using a code generation algorithm, based on a first secret key, the first secret key being retrieved from a database by indexing the unique identification code into the database, the database including identification codes for authentication devices that have been registered for accessing the remote service;

communicating the service authentication code to the user via the communications network;

receiving or entering the service authentication code into an authentication device associated with the user;

the authentication device generating, using the same code generation algorithm, an expected code value based on a second secret key and thereafter comparing the expected code value to the service authentication code; and responsive to the comparison, and in the event that the expected code value correlates with the service authentication code, the authentication device generating a response that indicates to the user the authenticity of the remote service.

As will be appreciated, the above examples have been provided as non-limiting examples of possible applications of the present invention. It is to be understood that the present invention, in different embodiments, may find application in a range of areas beyond those identified above. Indeed, it is envisaged that the present invention may be applicable to a broad range of applications that involve authentication between a user and a remote service, whether that authentication be one-way (in either direction) or mutual (both directions).

BRIEF DESCRIPTION OF THE DRAWINGS

The present invention will now be described in relation to various embodiments illustrated in the accompanying drawings. However, it must be appreciated that the following description is not to limit the generality of the above description.

In the drawings:

FIG. 5 is a table illustrating an example of a displacement process for displacing pseudorandom encoding sequences in accordance with an embodiment of the present invention;

FIG. 6 is a table illustrating an example of a further displacement process for further displacing pseudorandom encoding sequences in accordance with an embodiment of the present invention;

DETAILED DESCRIPTION OF A PREFERRED EMBODIMENT

Figure 1:
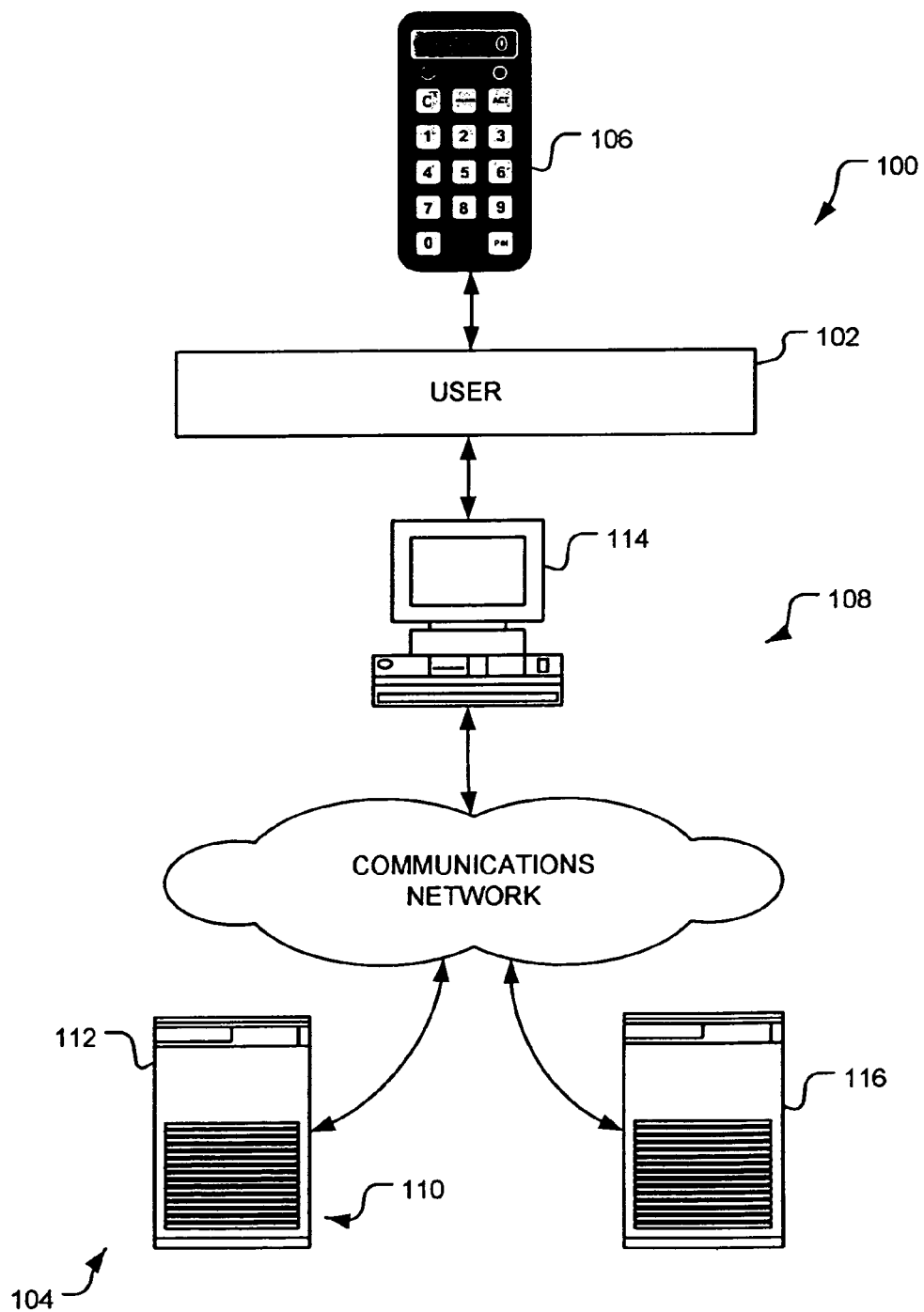
FIG. 1 is a system block diagram of a system that is suitable for performing a method according to an embodiment of the present invention.

A system 100 for authenticating between a remote service and a user 102 according to an embodiment of the present invention is shown in FIG. 1. The system 100 includes a remote service 104 and an authentication device 106 operable by the user 102 to receive a service authentication code provided by the remote service 104 via a communications network 108.

The communications network 108 shown here is a global computer network, (such as the Internet) that includes a network device 110 (shown here as a remote server 112) for hosting the remote service 104, a user operable device 114, and an authentication server 116, each of which are compatible with and connected to the other elements of the communications network 108 to allow communication between the remote server 112, the user operable device 114 and the authentication server 116. Although the communications network 108 will be described in terms of a global computer network, it is to be appreciated that the communications network 108 need not be so limited. Indeed, a system 100 according to another embodiment of the invention may be deployed using other types of communications networks 108 such as a public land mobile network (PLMN), a public switched telephone network (PSTN) or a combination of different types of internetworked communication networks. As will be appreciated, the network device 110 and the user device 114 will vary according to the type(s) of communications network(s) used 108.

The authentication server 116 may include a single processing unit (such as a single server) or a cluster of smaller focussed devices equipped with a suitable operating system. A suitable operating system may include Windows, Linux or Solaris. In this respect, in using the word "server" we mean a physical server (that is, a separate machine), or a virtual server (that is, more than one function on the same physical machine), or a service or a cluster of servers/services (that is, multiple physical or virtual devices to enable load balancing, redundancy and scalability).

In the illustrated embodiment, the authentication device 106 may be used to authenticate the remote service 104 to the user 102 via the communications network 108, and/or authenticate the user 102 to the remote service 104.

Figure 2:
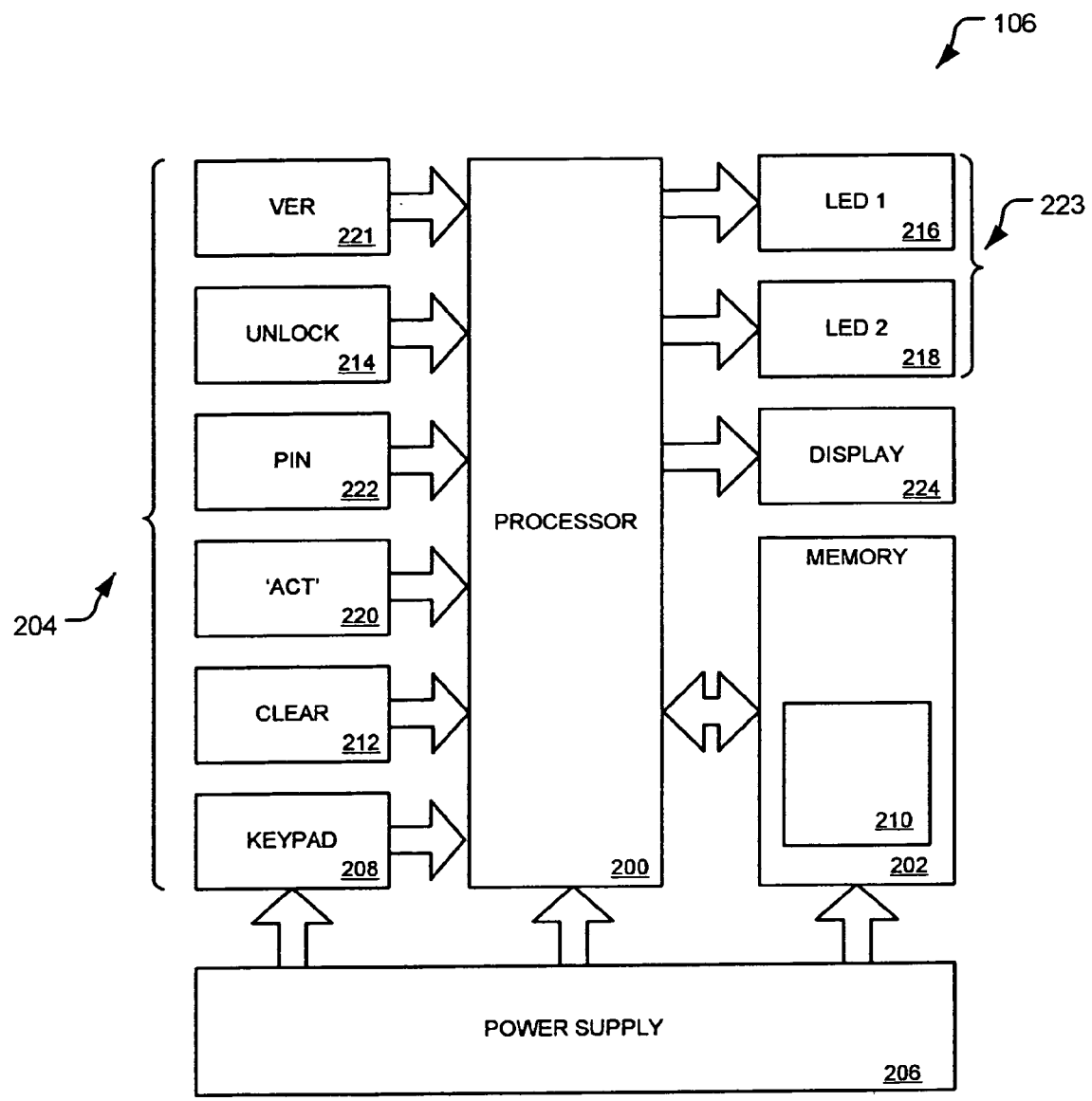
FIG. 2 is a block diagram of an authentication device according to an embodiment of the invention.
Figure 2A:
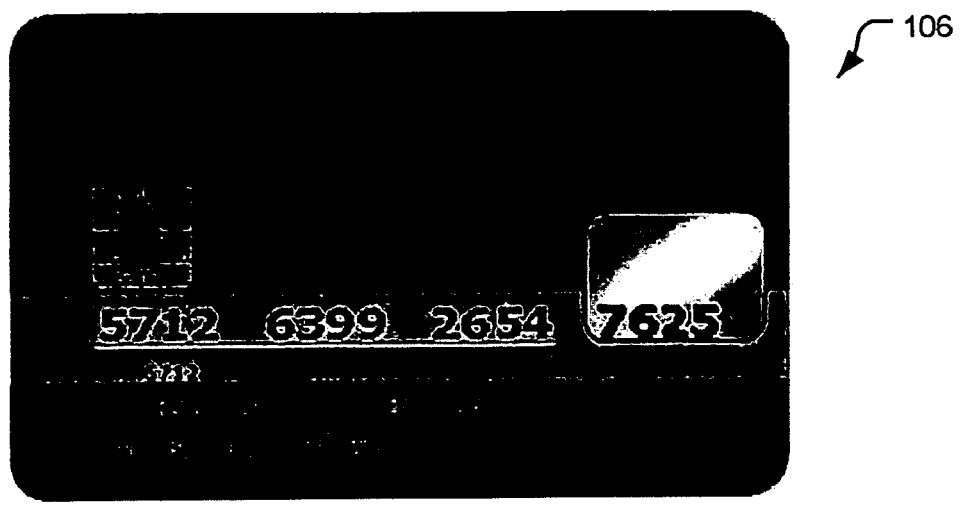
FIG. 2A is a front view of an embodiment of an authentication device of the present invention.
Figure 2B:
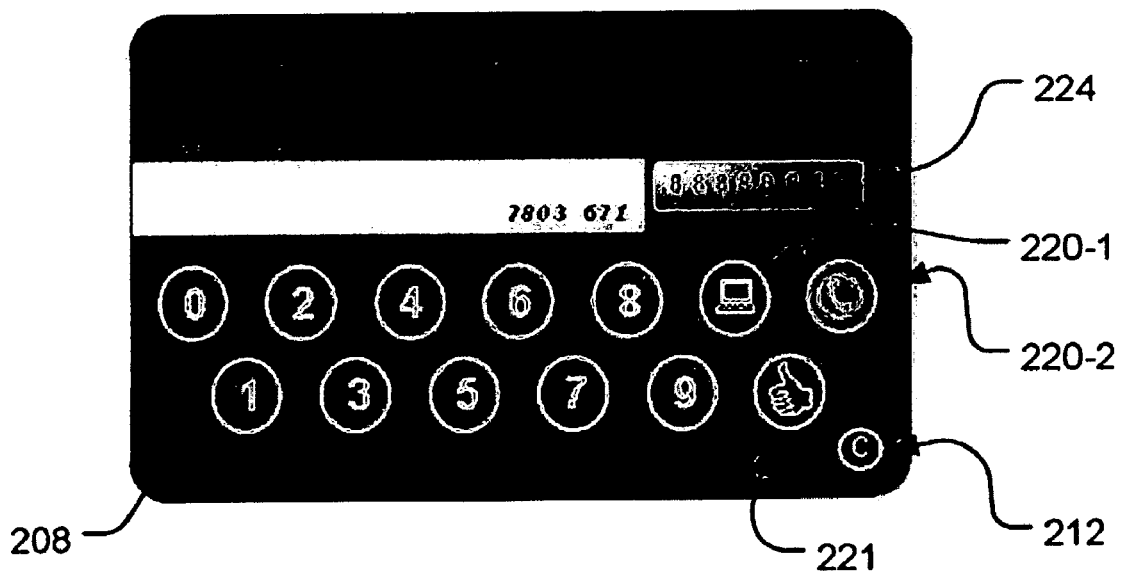
FIG. 2B is a rear view of the embodiment of the authentication device shown in FIG. 2A.

FIG. 2 depicts a block diagram of embodiment of an authentication device 106. As shown, the authentication device 106 may be any consumer or business device with a processor 200, on-board memory 202, input means 204 (such as a keypad 208 for keying of input values) and power supply 206 including, but not limited to mobile phones, personal data assistants (such as HP IPAQs, Palm Pilots and the like), portable music players, or a customised device (such as a smart card), with a software program 210 installed either by the manufacturer or by the user. One example of an authentication device 106, in the form of an intelligent "credit card", is depicted in FIG. 2A and FIG. 2B. The software program 210 is stored on the on-board memory 202 in the form of a set of instructions that are executable by the processor 200. The processor 200 executes an input driver provided in the set of instructions to allow the input means 204 to be operated by the user to receive, or enter, the service authentication code into the authentication device 106. In the present case, the processor 200 is a Texas Instruments MSP-430. However, it is to be appreciated that any suitable processor may be used.

Once received, or entered, the processor 200 generates, using the same code generation algorithm as that used to generate the service authentication code, an expected code value based on a secret key associated with the authentication device 106. The processor 200 also executes the set of instructions to provide a comparator means for comparing the expected code value to the service authentication code to generate a response indicative of the authenticity of the remote service 104 according to a comparison of the expected code with the service authentication code.

As shown, the input means 204 also includes a clear button 212 to enable re-keying of input values, an unlock button 214 to unlock the authentication device 106 for use after the service authentication code provided by the authentication server 116 has been input. The input means 204 of the illustrated authentication device 106 also includes an "ACT" 220 button that when pressed reveals an activation code, a "PIN" 222 button for encoding a user's PIN after it has been input, to generate a user authentication code. The input means 204 also includes a "VER" button 221 to activate the comparator means to correlate the service authentication code against the expected code value generated by the authentication device 106 using the secret key associated with the authentication device 106.

As is evident from FIG. 2A and FIG. 2B, different embodiments of an authentication device 106 in accordance with the present invention may provide different input means 104 and thus different functionality—depending on the capability of the authentication device 106 (that is, whether the authentication device is capable of authenticating a remote service to a user, or a user to a remote service, or both a remote service and a user). For example, the input means 204 of the authentication device 106 illustrated in FIG. 2A and FIG. 2B includes dual "ACT" buttons 220-1, 220-2, a "VER" button 221 and a clear button 212. In the embodiment depicted in FIG. 2A and FIG. 2B, "ACT" button 220-1 is provided for generating an activation code for use when authenticating a remote service 104 directly (such as, via the internet), whereas "ACT" button 220-2 is provided to generate an activation code for use when authenticating a remote service via an intermediary (such as via a call centre).

Returning again to FIG. 2, as shown, an output display 224, such as an LCD display, is also provided to provide information, such as instructions, to the user 102 and highlight inputs.

A response means 223, shown here as a pair of indicators including a red LED indicator 216 that illuminates when the service authentication code does not correlate with the expected code value and a green LED indicator 218 indicator that illuminates when the service authentication code correlates with the expected code value, is also provided. Whilst the illustrated authentication device 106 includes a response means in the form of a pair of LED's, it will be appreciated that any suitable response means 223 may be used. For example, in another embodiment, a response means 223 may include an audio tone generator that generates a tone that is indicative of the authentication device 106 authenticating the remote service 104. In yet another embodiment, the response means 223 may include a suitable message displayed on the display 224.

In addition to the software program 210, in an embodiment the on-board memory 202 of the authentication device 106 also contains pre-programmed data items as identified in the following list. It is to be understood that the following list is exemplary only.
1. The activation code;
2. The secret key associated with the authentication device 106 (hereafter referred to as the "DPIN");
3. A first pseudorandom encoding sequence for remote service authentication (hereafter referred to as the "Device Challenge Sequence", (DCS));
4. A second pseudorandom encoding sequence for remote service authentication (hereafter referred to as the "Device Encoding Sequence" (DES));
5. A first pseudorandom encoding sequence for user authentication (hereafter referred to as the "User Challenge Sequence" (UCS));
6. A second pseudorandom encoding sequence for user authentication (hereafter referred to as "User Encoding Sequence" (UCS));
7. An Encoding Sequence Displacement Sequence, ESDS);
8. An Encoding Sequence Displacement Sequence Reference (ESDSREF);
9. A Challenge Sequence Displacement Sequence (CSDS);
10. A Challenge Sequence Reference (CSREF);
11. An Encoding Sequence Reference (ESREF); and
12. PIN Displacement Codes (PDC):

A brief summary of the function of each of the above-listed data items is provided in the following description.

1. Activation Code:

The activation code is an x digit alphanumeric code unique to every authentication device 106 and is used as a means to both register an authentication device 106 with, and activate a response from, a remote service or authentication server 116. The use of the activation code will be described in more detail later.

An activation code may include any suitable coding scheme. In an embodiment, the activation code includes a six digit code of characters drawn from a character set that includes twenty-four alpha characters (perhaps, not utilizing both "O" and "I", due to their possible confusion with both 0 and 1) and all ten digits between "0" and "9". Such a scheme would provide 1.545 billion combinations (34×34×34×34×34×34).

In the following description, the following example of a six digit activation code will be used: "RF6D9S".

2. The Device PIN (DPIN):

The DPIN is a pseudorandom x digit code that remains static to the authentication device 106 to which it relates. This, the DPIN is a code that is uniquely associated with an authentication device 106. There is no correlation between the activation code and the DPIN.

During authentication of a remote service 104, the DPIN is used as a component of the service authentication code communicated between the authentication server 116 and the authentication device 106.

In an embodiment, the DPIN includes a numerical sequence of four characters. Such a sequence provides a 1/10000th chance of it being guessed. In the following examples, a four digit DPIN of "6794" will be used.

3. Device Challenge Sequence (DCS) Codes:

Each DCS code is a code that is used in the generation of an expected code value, by an authentication device 106, based on the DPIN of the authentication device 106. An authentication device 106 will typically store multiple unique DCS codes. In the present case, each DCS code includes a sequence of non-repeating numerical characters. In the following examples, the following four examples of DCS codes will be used: "2196758304", "0123456789", "6387109245" and "8253614709".

4. Device Encoding Sequence (DES):

The DES is a pseudorandom encoding sequence that is used for authenticating multiple service authentication codes. While the length of the DES should effectively be immaterial, given the subsequent displacement of the characters, the lower this number, the greater the displacement complexity and thus the greater the number of service authentication codes required.

Typically, the length of the DES will be between five-hundred and one thousand sequence bits. A length in this range would allow between fifty and one-hundred uses before displacement would be required. However, in an embodiment, the DES has a length of at least five-hundred digits so as to enable at least fifty authentication cycles. In the following examples, the following example of a twenty digit DES (that would enable the verification of two service authentication codes) will be used: "73619482640194827351".

5. User Challenge Sequence (UCS) Codes:

In an embodiment, the UCS codes are used to encode a user PIN input by the user to thereby provide a user authentication code. In the present case, the UCS codes are used as many times as there are multiples of ten digits in the UES.

However, an added complexity could be the rotational use of such UCS codes, thus further eliminating any possible correlation between the OTPs and UES from a cryptographic perspective.

The UCS codes are used as the means of encoding the PIN input by the user. In the following examples, the following four examples of UCS will be used: "6387109245", "8253614709", "2196758304" and "0123456789".

6. User Encoding Sequence (UES):

The UES is a pseudorandom encoding sequence that is used for encoding x user selected PINs. It is preferred that this sequence be at least five-hundred digits in length so as to enable the encoding of fifty user selected PINs.

As with the DES, the length of the UES should not really matter. However, to avoid over complicating the displacement sequence, it should preferably have a sequence length of between five-hundred and one-thousand digits to thus enable between fifty and one-hundred uses.

A one-thousand digit UES would provide approximately $32 \times 10^{1530}$ possible variations. In the following example, the following example of a twenty digit UES will be used: "A23CTBLM4S5RT7P6SJK9". The example twenty digit UES would enable the encoding of the user's selected PIN twice.

7. Encoding Sequence Displacement Sequence (ESDS):

In an embodiment, ESDS displacement sequences are used to generate "new" DES and UES.

However, to avoid a sequence as long as the DES and UES themselves, in which case, new DES and UES may as well be defined, the ESDS is effectively repeated a number of times. For example, for a five-hundred to one-thousand digit DES and UES, the ESDS should be a one-hundred digit code, effectively requiring between five and ten displacement codes.

The x ESDS displace both the DES and UES once they have been used x number of times (with x used for the DES and UES being divided by ten to arrive at this value).

Each of the x displacement sequences is based on an x (for example one hundred) digit numerical sequence used to enable the displacement of both the DES and UES.

For example, five one-hundred digit ESDS sequences could be used to displace five-hundred digit DES and UES, with each ESDS being used against each one-hundred digits of the DES and UES. Each x digit sequence is a randomly generated numerical sequence using each numerical digit between one and x, which have been used to make up the length of the sequence. For example, a hundred digit ESDS would be made up of all numbers between one and one hundred. In the following examples, the following three examples of twenty digit ESDS will be used:

1. 06.16.09.13.01.03.19.12.18.14.05.08.07.10.02.17.20. 11.15.04
2. 07.20.09.02.11.08.16.01.10.15.03.17.05.14.04.12.19. 06.18.13
3. 10.04.14.01.20.05.13.09.03.12.17.08.11.19.02.18.06. 16.07.15

8. ESDS Reference (ESDSREF):

An ESDSREF reflects which of the DES and UES displacement sequences are in use and is primed as "1", but increases by one each time a displacement sequence has finished. Therefore, if there are five ESDS, the ESDSREF would rotate between one and five.

9. Challenge Sequence Displacement Sequence (CSDS):

A CSDS includes numerical codes that are used to establish the first digit of both the x digit DES and UES and thereby establish the first ten digit block of the x available in each sequence. For example, three "twenty" digit CSDS numbers include 6, 13, 17. In another example, five "five-hundred" CSDS numbers include: 083, 136, 276, 343, 435.

9. CSDS Reference (CSDSREF):

The number of CSDS used are reflected by the CSDSREF which will therefore rotate between 1 and the total number of CSDS used. Thus, the CSDSREF reflects which of the CSDS are in use and is primed as "1".

10. CS Reference (CSREF):

The CSREF reflects which UCS and DCS code is being used and is primed as "1". This could rotate after every displacement sequence or for added complexity, for every logon. For even greater complexity, it could be increased by 1 for every displacement sequence, but then when each of the UCS and DCS codes have been used once, they could then rotate each time a user logs on.

11. Encoding Sequence Reference (ESREF):

The ESREF is used to ensure the authentication device 106 remains in sync with the authentication server 116 in the unlikely event that a user 102 inputs a valid service authentication code that did not originate from the authentication server 116.

12. PIN Displacement Codes (PDC):

In an embodiment, a PDC is used to create a virtual PIN, which changes after every x uses of the authentication device 106. The PDC's would be used to alter the actual user's PIN selected to arrive at a unique six digit PIN every time, regardless of whether the user PIN selected by the user was a four, five or six digit PIN.

The x PDC's would be used each time the DES and UES displacement sequences were used and would simply be used to alter the user's selected PIN to thereby create a virtually new PIN each x times the authentication device 106 is used. Where the alteration creates a negative value, this would be changed to a positive value using the same numerical digits. The PDC's are completely random.

The PDC's provide additional complexity and may take up unnecessary memory. For the purposes of this specification, their use has not been described in detail, although it will be appreciated that the effect would be that the user's PIN would simply be changed to a virtual PIN and then encoded each time the user uses the authentication device 106.

The Authentication Server Components and Data

Figure 2C:
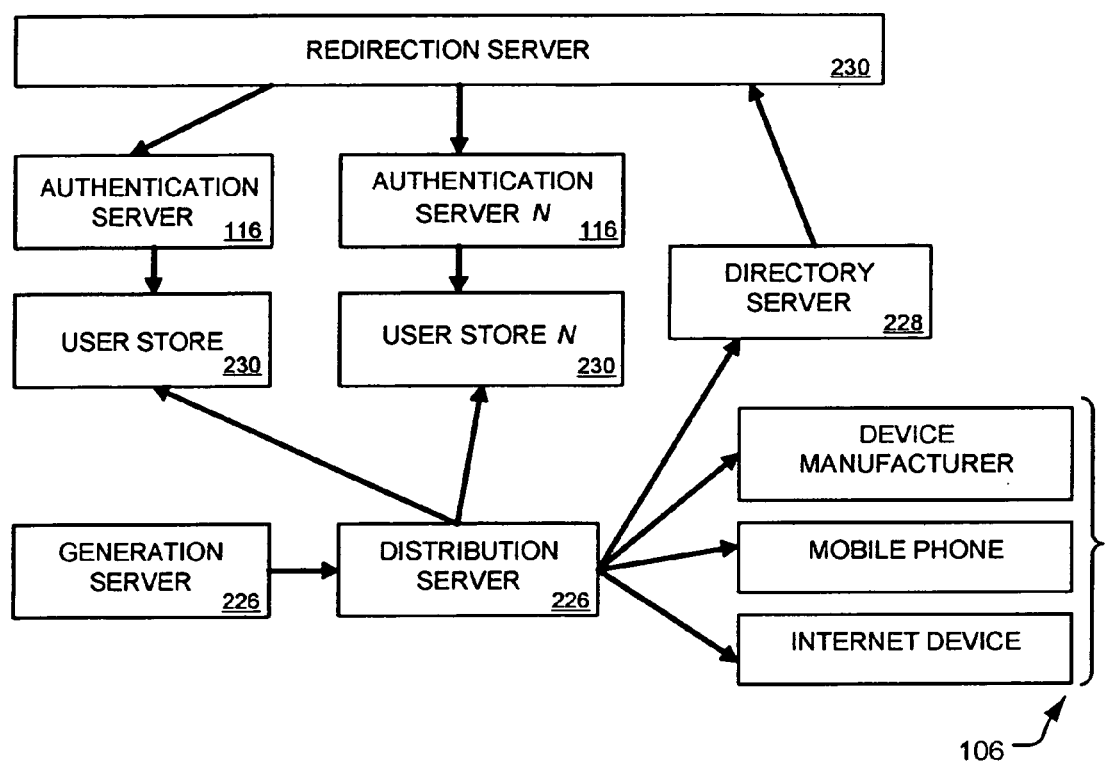
FIG. 2C is a is a block diagram of an embodiment of a system according to the present invention that includes an authentication server.

An embodiment of a system that includes an authentication server 116 is depicted in FIG. 2C. In this embodiment, a generation server 226 generates the DPIN and the other pre-programmed data that is loaded onto an authentication device 116 and the authentication server 116. This DPIN, and the other pre-programmed data is then distributed to the end users of the data. In the present case, one copy is sent to a user store 230, and one to the end authentication device 106, either during manufacture and configuration of the authentication device 106, or after the authentication device 106 has been issued to a user 102, perhaps by downloading the DPIN and the other pre-programmed data to an electronic device such as a phone, PDA, internet device or the like to thereby create the authentication device 106.

The activation code and the address of the user store 230 are sent to a directory server 228, which in turn is read by, or updates, a redirection server 230.

In the embodiment depicted, when a user 102 attempts to login to a remote service, the redirection server 230 reads the directory server 228 (or local copy of the directory) and sends an authentication request to the authentication server/cluster 116 that stores the server-side version of the DPIN. For example, a user 102 (ref. FIG. 1) may log on through a remote service 104 (ref. FIG. 1) which in turn redirects the request through to a bank, or issuing organisation that issued the authentication device 106 to a user 102. Such a step enables "federation".

The authentication server 116 performs the computational functions for the code generation algorithm, and stores the current state of variables and the like in the user store 230 associated with the user 102 (ref. FIG. 1).

The following section describes the data components stored on an authentication server 116 relating to each authentication device 106. It is to be understood that the following list is exemplary only.

1. The activation code;
2. The secret key (DPIN) associated with the authentication device 106 registered with the authentication server 116, and thus registered to access the remote service.
3. The first pseudorandom encoding sequence for remote service authentication (hereafter referred to as the "Device Challenge Sequence" (DCS));
4. The second pseudorandom encoding sequence for remote service authentication (hereafter referred to as the "Device Encoding Sequence");
5. The first pseudorandom encoding sequence for user authentication (hereafter referred to as the "User Challenge Sequence" (UCS));
6. The second pseudorandom encoding sequence for user authentication (hereafter referred to as "User Encoding Sequence" (UCS));
7. The Encoding Sequence Displacement Sequence (ESDS)
8. The Encoding Sequence Displacement Sequence Reference (ESDSREF);

9. The Challenge Sequence Displacement Sequence (CSDS);
10. The Challenge Sequence Reference (CSREF);
11. The Encoding Sequence Reference (ESREF); and
12. The PIN Displacement Codes (PDC).

Figure 3:
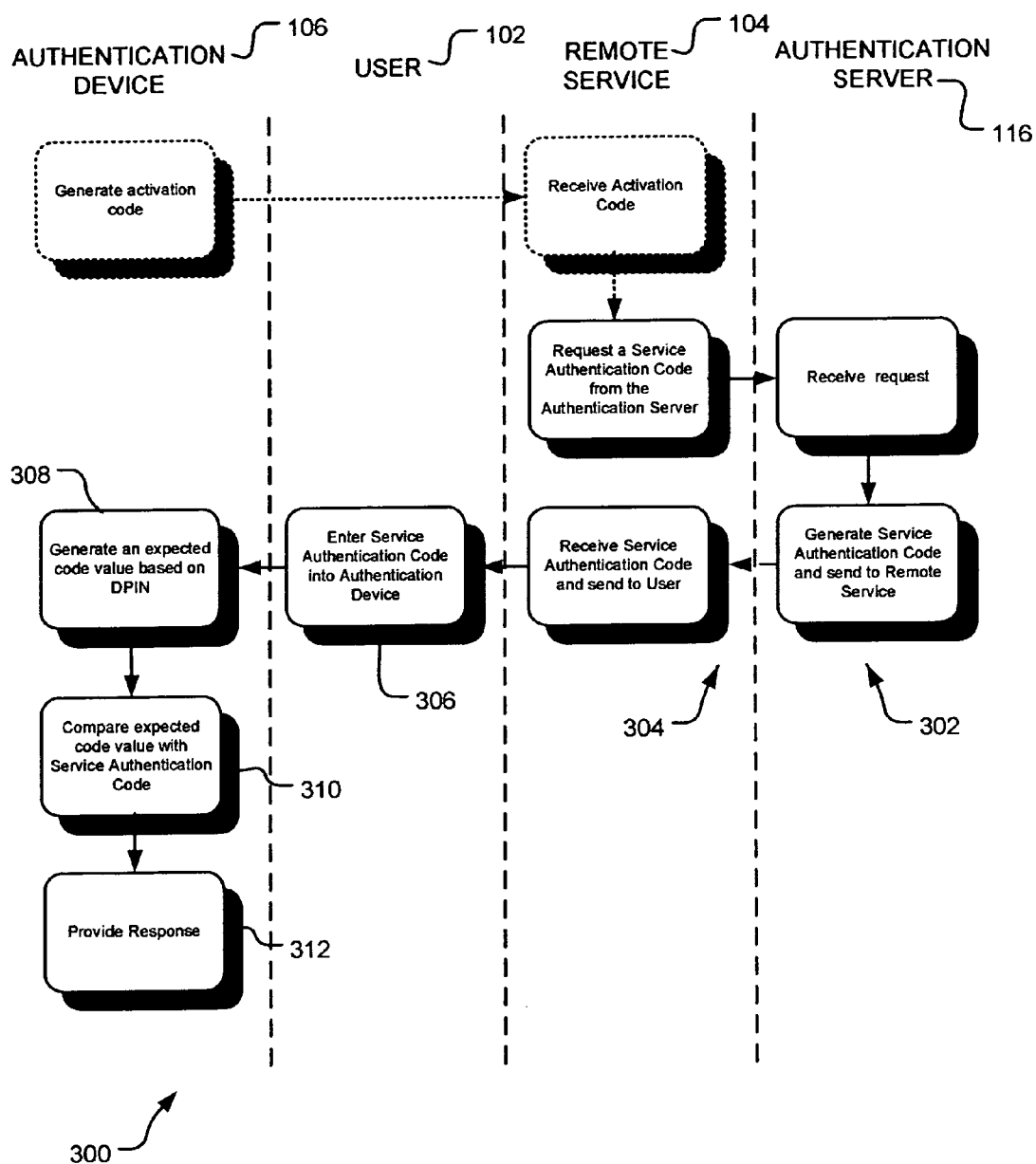
FIG. 3 is a flow diagram that describes the steps in a method in accordance with an embodiment of the present invention for authenticating a remote service to a user.

FIG. 3 shows a flow diagram of a method 300 of authenticating a remote service 104 to a user 102.

As shown, the method 300 includes a step 302 of the remote service 104 obtaining a service authentication code that has been generated, using a code generation algorithm, based on a first secret key.

At step 304, the service authentication code is communicated to the user 102 via the communications network.

At step 306, the service authentication code is then received or entered into the authentication device associated with the user 102.

At step 308, the authentication device 106 generates, using the same code generation algorithm, an expected code value based on a second secret key (in this case, the DPIN) and thereafter at step 310 compares the expected code value to the service authentication code.

Finally, at step 312, responsive to the comparison, and in the event that the expected code correlates with the service authentication code, the authentication device generates a response that indicates to the user 102 the authenticity of the remote service 104. As will be appreciated, the expected code generated by the authentication device 106 will only correlate with the service authentication code provided by the remote service 104 if the first secret key and the second secret key are the same. Thus, if the remote service 104 obtains a service authentication code that has been generated using other than the same key as the second secret key (that is, the DPIN), then the service authentication code will not correlate with the expected code.

Figure 4:
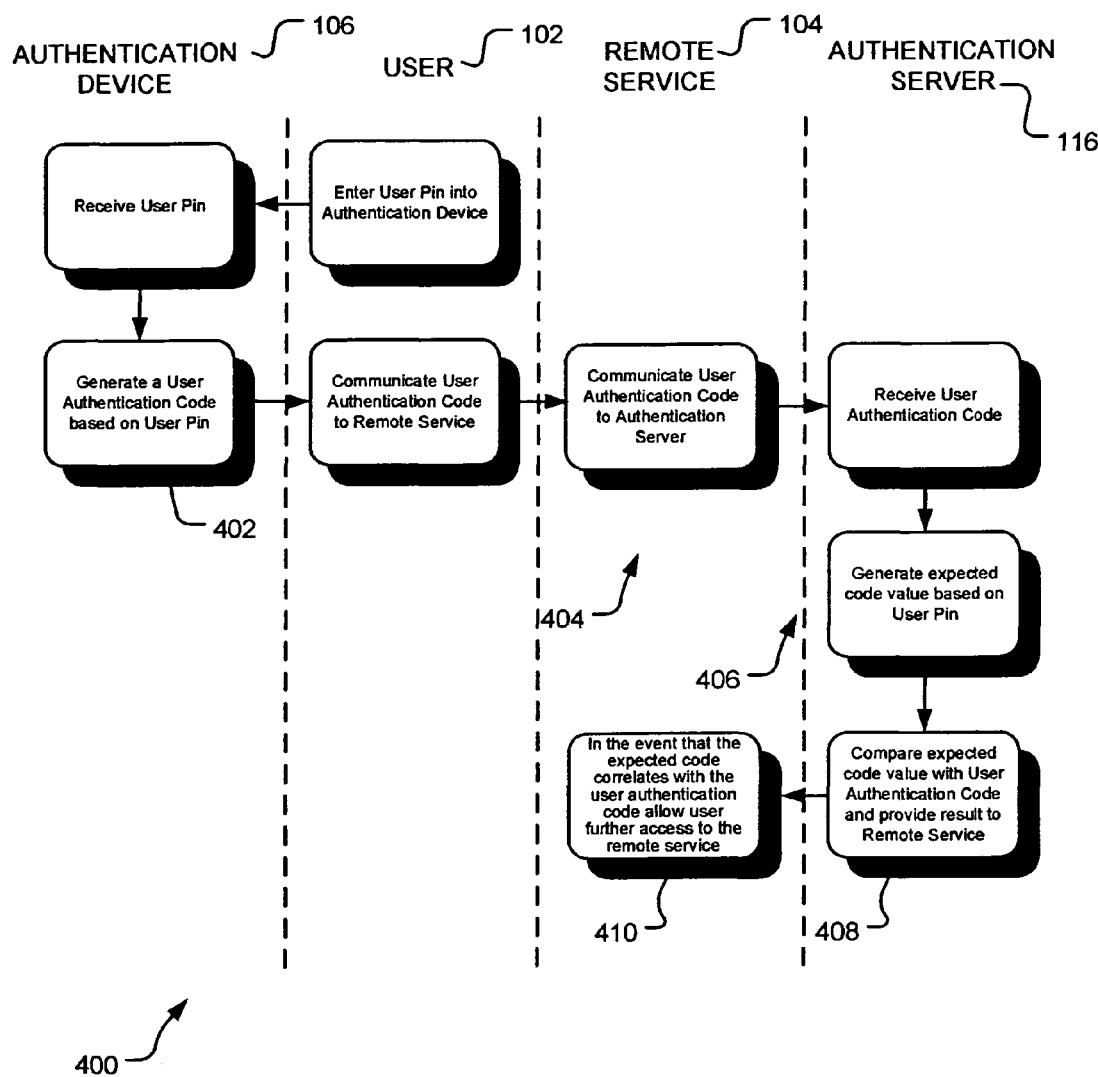
FIG. 4 is a flow diagram that describes the steps in a method in accordance with an embodiment of the present invention for authenticating a user to a remote service.

FIG. 4 shows a flow diagram of a method 400 of authenticating a user 102 to a remote service 104. As is shown, the method 400 includes the step 402 of the authentication device 106 generating, using a code generation algorithm, a user authentication code value based on a third secret key (in this case, a user entered personal identification number).

At step 404, the user authentication code is communicated to the remote service 104 via the communications network. At step 406, an expected code value is generated by the authentication server 116 based on a fourth secret key.

At step 408, the expected code value is compared with the user authentication code. Finally, and responsive to the comparison and in the event that the expected code correlates with the user authentication code, at step 410 the remote service 104 allows the user 102 further access to the remote service 104.

As will be appreciated, the expected code generated by the authentication server 116 will only correlate with the user authentication code provided by the authentication device 106 if the third secret key and the fourth secret key are the same. Thus, if the authentication device 106 provides a user authentication code that has been generated using other than the same key as the fourth secret key (that is, other than a user's registered PIN), then the user authentication code will not correlate with the expected code.

Authentication Process Flow.

In general terms, some or all of the following processes may be implemented as a part of an authentication service that utilises a method, or device, according to an embodiment of the present invention:

1. A user registration process for initially registering an authentication device 106 with an authentication server 116;
2. A "normal logon" process for allowing a user to authenticate a remote service 104 using their authentication device 106;
3. A "displacement process" for controllably shifting the digits of each UES and the DES after each UES and DES has been used;
4. A process for resetting a User PIN; and
5. One or more processes for allowing the applicability of the authentication method or device in a multiple service environment;

The following examples of the above and other processes are provided for exemplary purposes.

EXAMPLE 1

Initial Registration of an Authentication Device with an Authentication Server

An authentication device 106 can be provided to a user 102 prior to registering the authentication device 106 for the remote service 104 to which the authentication device 106 may be used to gain access.

In such an embodiment, the user 102 may "logon" to a remote service 104 using existing credentials such as a user ID and password. Having logged on, the user 102 can then select to register an authentication device 106 with the authentication server 116. Registration of an authentication device 106 with an authentication server 116 will typically involve the following steps:

1. An activation and verification phase;
2. User PIN selection; and
3. Registration of user information.

Each of the above steps is described in more detail below.
Activation and Verification To register an authentication device 106 with an authentication server 116, the authentication server 116 will first prompt the user 102 to provide the activation code (in this example: "RF6D9S") for the user's authentication device 106. As previously described, the activation code may be displayed on the authentication device 106 display by pressing the "ACT" button 220 (ref. FIG. 2).

After the activation code has been provided, the authentication server 116 can then respond with a service authentication code to verify that the user 102 is actually carrying the authentication device 106 they have indicated they based on the entered activation code.

This service authentication code (SAC), includes an encoded DPIN (in this example: "6794"), retrieved by the authentication server 116 based on the authentication code. In this respect, the authentication server 116 maintains, for each issued authentication device 106, an index of activation codes and the associated DPIN's. Thus, on receipt of an activation code, the authentication server 116 is able to retrieve the DPIN associated with the received activation code.

The service authentication code also includes the ESREF—which at the point of initial registration would be number "01". Thus, together with the encoded DPIN, in the present example the service authentication code is a six digit code.

By way of example, using the example twenty digit DES of "73619482640194827351" (that is, two ten-digit sequences), and the DCS code reflected by the CSREF (in this example "1" reflecting the example: "2196758304") with the ESREF of "01", the service authentication code would be generated by encoding the retrieved DPIN using the DCS code against the first ("01") ten digits of the DES as follows:

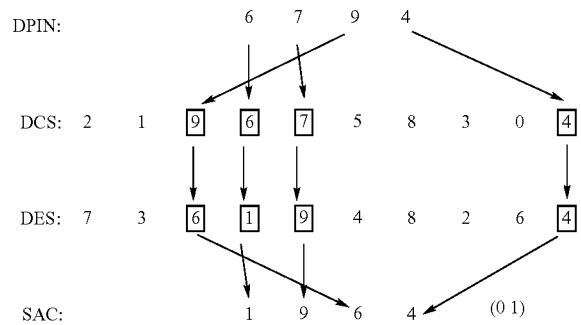

The user 102 then enters the provided service authentication code into the authentication device 106.

The authentication device 106 encodes the DPIN as stored on the authentication device 106 (that is, the DPIN associated with the authentication device 106) against the first ten-digit block of the DES (given the last two digits of the service authentication code would be "01") and the DCS code stored on the authentication device 106.

Having input the six digit service authentication code (in this example: "196401"), the authentication device 106 then compares the first four digits of the service authentication code against the corresponding digits of the expected code generated by the authentication device 106 using the DPIN associated with the authentication device 106.

In the present example, this is achieved by pressing a "VER" button 221 (ref. FIG. 2) on the authentication device 106. The authentication device 106 would also check that the last two digits of the service authentication code are equal to the ESREF+1.

If the service authentication code is authenticated, the green LED 218 (ref. FIG. 2) illuminates and "Enter PIN" is displayed on the authentication device display. The ESREF is then increased by one for the next service authentication code. On the other hand, if the service authentication code is not authenticated, the red LED 216 (ref. FIG. 2) illuminates and a "Try Again", or similar message, is displayed on the authentication device display 224 (ref. FIG. 2).

If the service authentication code fails a number of times, the remote service 104 is either not valid or the authentication device 106 the user 102 is using is not the correct one that corresponds to the activation code.

Select PIN

The user 102 should then select and input a unique user PIN and then press the "PIN" button 222 (ref. FIG. 2). The authentication device 106 would then use the first block of ten digits of the UES and the first UCS code to generate an encoded user PIN.

By way of example, using the example twenty digit UES of "A23CTBLM4S5RT7P6SJK9", and a UCS code that corresponds to the CSREF (for example, "6387109245"), with the DES block of "01"—as provided with the service authentication code, the user PIN (in this example: 4876) would be encoded as follows:

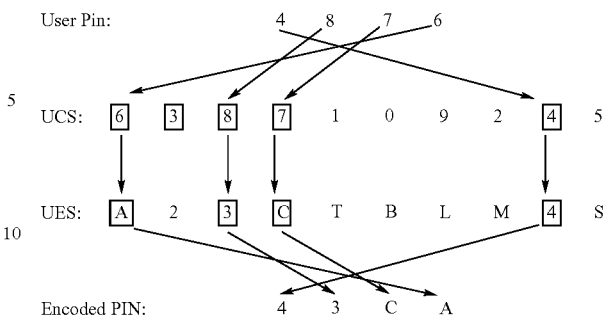

Once the user 102 has input an encoded user PIN, the authentication server 116 can decode the user PIN and store it for future use for authentication a user.

An additional process may be employed to verify the user PIN by encoding it against the second ten digit block of the UES. However, this may confuse the user and, in the event the user PIN is forgotten, the existence of the Q&A function (as explained in more detail later) would enable the user to reset it securely. Furthermore, the authentication device 106 could retain logic whereby the user's selected user PIN could be verified by requesting that it be input a second time to ensure the first user PIN is the same as the second user PIN input, and before the user PIN is encoded.

Q&As

Having completed the user PIN selection, the user 102 may then register their details to a Q&A based process of a conventional type. Questions derived from Q&A based process may be used to determine the security surrounding a reset process.

Having successfully completed the registration process with the authentication server 116, a user's user ID—specific to the third party the authentication device 106 is being registered for—would be sent to the authentication server 116.

When a user 102 then registers their authentication device 106 for use with another third party, all they would need to do is provide their unique activation code and verify their user PIN. The third party could then send the user's ID to the authentication device 106 for use when the user authenticates to that particular service. Thus, there would be no need to repeat the Q&A process having already been done.

This process would enable the authentication device 106 to be used for multiple remote services while providing the same degree of security.

EXAMPLE 2A

Normal Logon

The user 102 will logon to the particular remote service 104 for which the authentication device 106 provides a means of authentication by inputting the activation code, retrieved by pressing the "ACT" button on the authentication device 106.

The remote service 104 will then pass the activation code to the authentication server 116. The authentication server 116 then responds with a service authentication code to verify the user 102 is actually carrying the authentication device 106 they have indicated they are, based on the entered activation code.

At the point of sending the service authentication code to the user 102, a timer may start to limit the validity of the user's encoded user PIN to a pre-determined period of time, for example sixty seconds. This would prevent the encoded user PIN from being used should a ghost website successfully match the service authentication code and also limit, to some extent, the opportunity for a man-in-the-middle attack given the attacker would have to respond within the defined timeframe to gain access.

This service authentication code is made up of an encoded DPIN (in this example: "6794") and the ESREF—which will have increased by +1 each time the authentication server 116 is called. Together, the encoded DPIN and the ESREF create a six digit service authentication code.

By way of example, using the example twenty digit DES of "73619482640194827351" (that is, two ten-digit sequences) and the appropriate DCS and CSREF codes, for example "6387109245", with the ESREF of "02", the service authentication code would be generated by encoding the DPIN using the DCS code against the second ("02") ten digits of the DES as follows:

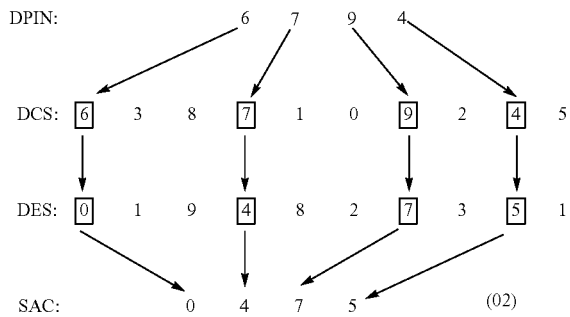

The user 102 must then input the service authentication code into the authentication device 106 which then encodes the DPIN stored on the authentication device 106 against the second ten-digit block of the DES (since the last two digits of the service authentication code were "02") and using the appropriate DCS code stored on the authentication device.

Having input the service authentication code, in this example "047502", the authentication device 106 would then check that the first four digits (in this example: "0475") match those generated by the authentication device 106, using the DPIN associated with the authentication device 106.

In the present case, this is achieved by pressing the "VER" button 221.

Again, if the service authentication code is authenticated, the green LED 218 (ref. FIG. 2) will illuminate and an "Enter PIN" prompt, or the like, is displayed on the authentication device 106 display. If the service authentication code is not authenticated, the red LED 216 (ref. FIG. 2) will illuminate and a "Try Again" prompt, or another appropriate message, is displayed on the authentication device display 224 (ref. FIG. 2).

Input PIN

Once the remote service 104 has been authenticated, the user 102 can then input their unique user PIN and then press the "PIN" button 222 (ref. FIG. 2).

The authentication device 106 then uses the second block of ten digits of the UES and the appropriate UCS code. By way of example, using the example twenty digit UES of "A23CTBLM4S5RT7P6SJK9" and the appropriate UCS code, for example "6387109245", with the ESREF of "02"—as provided in the service authentication code, the user PIN (in this example: "4876") would be encoded as follows:

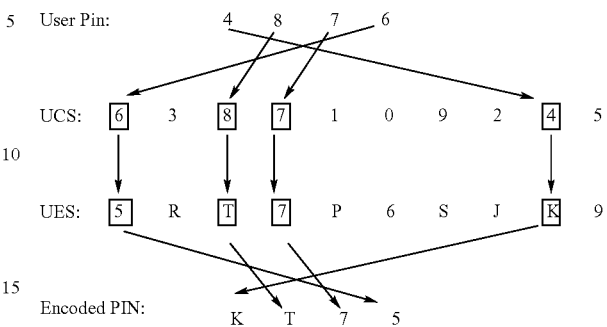

The user 102 then provides, either directly or indirectly, the encoded user PIN to the authentication server 116, which then attempts to match the encoded user PIN with a user PIN stored, or accessible to, the authentication server 116. In the present case, this is achieved by the authentication server 116 retrieving the DPIN for the activation code previously passed to the authentication server 1016, and encoding that DPIN, using the same UCS and UES used, by the authentication device 106 to encode the DPIN associated with the authentication device 106.

If the encoded user PINs match, the authentication server 116 sends an appropriate user ID to the third party for which authentication is being sought, along with a positive verification. If not, they would be requested to try again and after three failed attempts would be passed to the Q&A Sequence.

EXAMPLE 2B

Secondary Federated Registration

When a second third party, other than the authentication device issuer, becomes available for a user 102 to use their authentication device 106 as a means of authenticating themselves to the remote service 104, the user 102 could follow a simple registration process.

First, the user 102 will logon to a remote service 104, such as a website, using their existing credentials such as a user ID and password, according to the standards and security requirements of the third party. Having logged on, the user 102 will then select to register their authentication device 106.

Activate and Verify

The remote service 104 should first prompt the user 102 for the activation code (in this example: "RF6D9S"). Again, this is obtained on the authentication device 106 display by pressing the "ACT" button. Once provided to the authentication server 116, the authentication server 116 can then respond with a service authentication code to verify the user 102 is actually carrying the authentication device 106 they have indicated they are by the activation code they entered.

The service authentication code is made up of an encoded DPIN (in this example: "6794") and the ESREF—which at the point of secondary registration would be at least greater than "01"—which together would create a six digit service authentication code. For example, using the example twenty digit DES of "73619482640194827351" and the DCS code reflected by the CSREF (in this example "2" reflecting the example DCS of "2196758304"), with the ESREF of "02", the service authentication code would be generated by encoding the DPIN using the DCS code against the second ("02") ten digits of the DES as follows:

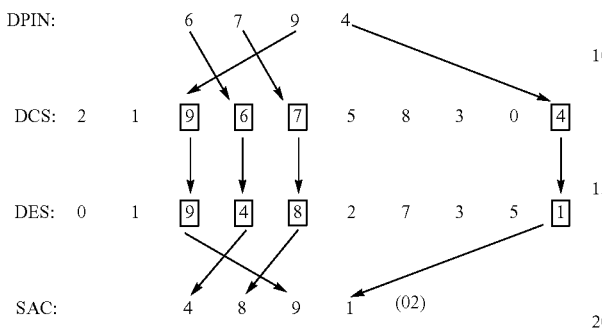

The user 102 will then input this service authentication code into the authentication device 106 which then encodes the DPIN stored on the authentication device against the second ten digit block of the DES (given the last two digits of the service authentication code would be "02") using the DCS code, again stored on the authentication device 106.

Having input the six digit service authentication code (in this example: "489102") the authentication device 106 would then check that the first four digits match those encoded on the authentication device 106. In the illustrated embodiment, this is achieved by pressing the "VER" button 221 (ref FIG. 2). The authentication device 106 would also check that the last two digits of the service authentication code are equal to the ESREF+1.

If the service authentication code is authenticated, the green LED 218 (ref. FIG. 2) will illuminate and "Enter PIN" could be displayed on the authentication device display and the ESREF would be increased by 1 for the next service authentication code. If the service authentication code is not authenticated, the red LED 216 (ref. FIG. 2) and "Try Again" or an appropriate message could be displayed on the authentication device display 224 (ref. FIG. 2). If the remote service authentication fails a number of times this would suggest the remote service is either not valid or the authentication device 106 the user 102 is using is not the correct one that corresponds to the activation code.

Input PIN

Given the authentication server 116 would have been able to determine that the user 102 is already registered (by their activation code) it would not then expect a user PIN to have to be selected by the user 102, but would expect their actual user PIN to be input which they would have already selected for use when originally registering themselves to the authentication server 116.

The user 102 should then input their unique user PIN and then press the "PIN" button 222 (ref FIG. 2). The authentication device 106 would then use the appropriate block of ten digits of the UES and the appropriate UCS code. For example, using the example twenty digit UES of "A23CTBLM4S5RT7P6SJK9" and a UCS code of "6387109245", with the ESREF of "02"—as provided with the service authentication code, the PIN (in this example: "4876") would be encoded as follows:

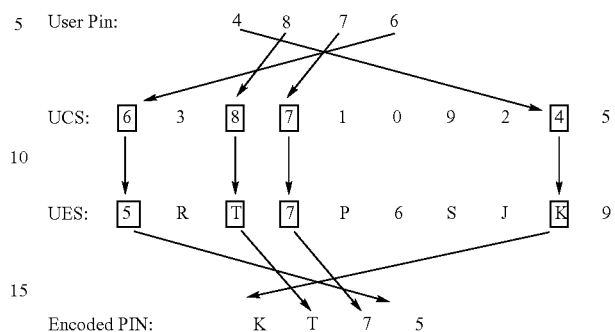

Once the user 102 has input the encoded user PIN, the authentication server 116 can match the encoded PIN having encoded the same PIN on the authentication server 116.

Having successfully completed the registration process with the authentication server 116, the user's user ID—specific to the third party the authentication device 106 is being registered for—would be sent to the authentication server 116.

If the encoded user PINs do not match, they would be requested to try again and after three failed attempts would be passed to the Q&A Sequence.

EXAMPLE 3

Displacement Process

In an embodiment that includes respective arrays containing DES, DCS, UCS and UES sequences respectively, each array may support a finite number of code generation events corresponding to the number of array elements in that array. Accordingly, after each sequence in an array has been used to generate a service authentication code, each character in each array element of the array may be controllably shifted to a different location within an array element to thereby modify the respective sequence.

Thus, in the illustrated embodiment, the method of authentication works on the basis of a number of displacement sequences which effectively scramble the DES and UES after one use.

Using the example twenty digit DES and UES (as opposed to full x digit sequences), and the example ESDS and CSDS, the authentication method would work as follows:

1. When each of the two ten digit blocks of the DES and UES have been used, which would be identified when a check of the ESREF revealed it was equal to the DES and UES divided by ten and plus one—having incremented by 1 after each successful service authentication code—the following steps would occur:

2. Both the DES and UES would be displaced. As shown in FIG. 5, this would be achieved by using the ESDS corresponding to the ESDSREF. For example, if the ESDSREF was "1", the first of the x digit ESDS would be used and both the DES and UES would be displaced according to this sequence. Each of the 'blocks' which make up the example twenty digits of both the DES and UES would be displaced according to this sequence. Using an example twenty digit ESDS against the DES and UES, this would result in the following.

ESDS: 06.16.09.13.01.03.19.12.18.14.05.08.07.10.02.17. 20.11.15.04

The displacement works on the basis of the above sequence reflecting where each character would move. In the above example, the first character of the DES or UES would move to position six, the second character would move to position sixteen, the third character would move to position nine and so on.

3. As is shown in the example illustrated in FIG. 6, after having displaced the DES and UES with the corresponding ESDS based on the ESDSREF, each sequence could then be further displaced by use of one of the five CSDS, as indicated by the CSDSREF. For example, using one of the three example CSDS, used for the twenty digit DES and UES, reflecting the first of three as indicated by the value of "1" in the CSDSREF, the DES and UES would be displaced as follows:

If the CSDSREF="1", the first of the three example twenty digit related CSDS would be used ("6"). Each of the characters used for the DES and UES would be moved forward six characters to reflect the change, thereby displacing the first character of both the DES and UES and further removing the risk of cryptographic compromise.

4. Having now established a new DES and UES, the following changes would then occur:

The ESDSREF would increase by +1. If this was greater than the total number of ESDSREFs, it would be set to "1";

The CSDSREF would increase by +1. If this was greater than the total number of CSDSREFs, it would be set to "1";

The CSREF would increase by +1. If this was greater than the total number of CSREFs, it would be set to "1" (note that for added complexity, the CSREF could simply rotate between 1 and the total number of UCS and DCS codes used for every logon to avoid any ability by which a cryptographer could try and create a sequence);

The ESREF would be set to "01"

The above example relates to an ESDS which is the same length as the DES and UES. If the DES and UES were, for example, one-thousand digits, and the ESDS one-hundred digits each, a different ESDS would be used to displace each one-hundred digit block of the DES and UES before the final CSDS associated displacement process.

As will be appreciated, in order to maintain code synchronisation between the authentication device 106 and an authentication server 116, the displacement process needs to be synchronised on both the authentication device and authentication server. After synchronisation, the authentication device 106 would ready for the next time the user needs to authenticate.

The next time a user logs on after the displacement process has completed the following data is used to position the process:

Both the DES and UES will have been displaced and aligned with a new starting character at position 1;

The CSREF would be set to a value between 1 and the total number of CSREF's which would reference the appropriate UCS and DCS codes for use in authenticating the service authentication code and encoding the user's PIN; and The next service authentication code presented by the authentication server would have the last two characters reset to "01" to indicate use of the first block of ten digits of both the DES and UES.

Once the displacement of both the DES and UES has been completed, the CSDS could then displace the entire sequence as a means of re-aligning the starting point for the use of the first ten digit block of each sequence. This would result in the following cryptographic complexities.

1. If an experienced cryptographer were to obtain all the OTPs used for the first one-hundred logons (based on a one-thousand digit UES), they would only have obtained 40% of the characters in the one-thousand digit sequence, given a four digit PIN would encode to a four digit password and only four digits of each ten digit block would have been used. This could reduce to only 20% in the event only two characters are used for the PIN. For example, "3553".

2. This would mean that each of the digits used within each encoded password could be any of the digits used in the corresponding service authentication code. Thus, nothing would have been revealed for the first one-hundred logons.

3. Following the complex displacement of all one-thousand characters, using the ESDS corresponding to the ESDSREF, a new starting point would then be defined by the CSDS, corresponding to the CSDSREF, thus effectively providing a new one-thousand digit UES.

4. If a cryptographer were to then capture each of the next one-hundred OTPs, they would again only gain between 20% and 40% of the data on which to try and base a sequence. However, these additional one-hundred OTPs would have been created against a different service authentication code and thereby any "possible" correlation between the two would have been lost and the complexity significantly magnified.

5. In theory, given a cryptographer would have gained nothing from the first one-hundred OTPs, they could then try and see which second $32 \times 10^{1530}$ UES works against each of the 3.6 million possible service authentication code sequences where they would have to try each of the one-thousand digits as the possible starting point and thereby determine which of the possible 3.6 million service authentication codes would have reflected the same PIN for the first $32 \times 10^{1530}$ digit UES used. Unfortunately, they would also have to contend with at least twenty-seven repeating UES characters (on the basis of a one-thousand digit UES), which will create multiple false positives and by the time they may think they have got somewhere, the displacement sequence will occur again and the service authentication code will also change.

6. Thus, while conceptually possible to calculate portions of past UES and establish possible patterns and potential PINs, the data on which such analysis is performed has to be historical and thus becomes obsolete each time the displacement sequence takes place.

EXAMPLE 4

Resetting a User Pin

When a user 102 either tries to logon unsuccessfully three times, or perhaps realises that they have forgotten their own user PIN, the user will be automatically transferred to the Q&A function.

The process would then be as follows:

1. If the user has simply forgotten their user PIN and wishes to reset it, they would be requested to input their activation code. If they have failed a number of times (for example, three), the activation code would have already been provided;
2. The activation code would be passed to the authentication server 116 for it to present a service authentication code to the user 102;
3. The user 102 would verify the service authentication code and be prompted to key in a randomly selected PIN (selected by the authentication server 116) to their authentication device 106;
4. They would then input the encoded PIN and submit this to the authentication server 116;
5. If the PIN demonstrates that they are carrying the correct authentication device 106, the user 102 will be presented with the Q&A process;
6. Successful completion of the Q&A process would result in the user 102 being asked to select a new user PIN and the authentication server 116 would then lock them out for a predetermined period of time, sufficient for the user 102 to contact the authentication device issuer or party to which they are trying to gain access, if they were not the one accessing the Q&A process;
7. Failure of the Q&A process should result in the user 102 having to visit a trusted source in order for them to re-enable their authentication device and for which a one-hundred point check would be required.

EXAMPLE 5

Applicability of Authentication Method or Device in a Multiple Service Environment In one embodiment, a user 102 may be able to use their single authentication device 106 for access to multiple remote services based on trust relationships that are expressed in terms of different levels of trust, or trust categories. For example, the authentication method may be based on trust categories, as follows:

Trust Level 3:
  A Trust Level 3 category may be achieved when a user 102 has completed a "100" point check that has been authenticated by authorised personnel at a bank or appropriate outlet.
  A Trust Level 3 category could be immediately achieved if a user 102 was new to Internet banking and had visited a branch to acquire their authentication device 106, at which point the bank would conduct the one-hundred point check and register the user with the remote service at the branch.
  Alternatively, if a user 102 wishes to achieve a Trust Level 3 category and they already have an authentication device 106, the user 102 will have to visit a bank or an appropriately trusted source in order to complete the one-hundred point check, at which point the user details could be updated on the authentication server 116.

Trust Level 2:
  A Trust Level 2 category may be achieved by when a user 102 registers their authentication device 106 via a service for which they have acquired previous credentials in a secure manner.
  For example, an existing user ID and password used for Internet banking would have only been provided to a user 102 by some secure means such as mail or at a branch. Therefore, the user 102 would be logging onto a sensitive service for which identity management was previously deemed under control.
  Similarly, information used to verify a credit card holder, when the card is not present, such as online purchases or telephone, would be deemed as a Trust Level 2 category as only the user should have access to the various unique codes on the card.

Trust Level 1:
  If a user was to acquire an authentication device 106 for use with a remote service, such as an online auction website, the initial registration of that user 102 would have been a simple process of self registration, without any identity management or control. Therefore, while the authentication device 106 would add additional security for all transactions subsequently undertaken by that individual for that particular service, there would be no means by which to verify their true identity.
  A user could be elevated from Trust Level 1 to a Trust Level 2 category by registering their authentication device 106 for use by a Trust Level 2 service provider, as long as the credentials used to identify the user prior to registration were provided by some form of identity management, as detailed under Trust Level 2. Similarly, a user 102 could be elevated to a Trust Level 3 if they were to visit a bank, or an appropriately trusted source, whereupon a one-hundred point check could be performed—for which terms and conditions would apply.
  It is important to note that a secondary identifier agreed between all service providers would have to be sufficiently unique to enable the user 102 to be securely associated with the respective account. For example, the online auction website mentioned previously would have to select a means by which the one-hundred point check could be securely linked to the account and similarly, a bank would need to define some form of identifier which would be deemed a suitable means by which to verify the user—such as a cash card account or similar.

Trust Level 3V:
  A fourth trust level could also be defined which would not be achievable by means of a process. This level of trust could be achieved when a user 102 has completed a pre-defined number of authentication cycles without use of their authentication device 106 being questioned or used for fraudulent purposes. Such an approach would provide a progressive trust relationship which would be deemed stronger than a Trust Level 2 category, but not as strong as a Trust Level 3 category. However, in time, it could be deemed acceptable by the collective services for which a particular device had been used to update the user status to Trust Level 3V.
  An online authentication report could be generated when an authentication device 106 had exceeded a pre-determined number of uses for a particular service. Each service could then determine to what extent they would be prepared to 'trust' the corresponding user 102 based on their activity with the remote service 104.
  When a user 102 has been accepted by all services for which they have exceeded the pre-determined number of uses, a progressive elevation to Trust Level 3V could be deemed appropriate to allow the user to access Trust Level 3 services—which have agreed to accept Trust Level 3V users—even though they have not completed the full one-hundred point check.
  It is envisaged that an embodiment of the invention that uses trust models of the type described above could further provide for virtual identity management, whereby use of the system could lead to a reliance on the identity of a given user based on the legitimacy of transactions and pre-determined transaction volumes.

EXAMPLE 6

Interoperable Authentication Device Trust Level Registration

The following sections explain a registration process for each Trust Level and also highlight the process flows associated with achieving a Trust Level 1 status.

Given there could be many variations and means by which to acquire an authentication device 106—such as post offices, consumer electronics stores and the like—that may not necessarily result in an authentication device 106 being provided in a secure manner, an embodiment of the invention provides a defined process on which registrations would occur and accordingly appropriate Trust Levels relating to the third party remote service providers. In essence, a user with an authentication device at Trust Level 1 would not be able to access services of a higher level.

Trust Level 3 Category:

A Trust Level 3 could be accomplished, by a user, in the following four ways:

(i) A new user 102 wishing to gain access to a service provided by a trusted source, such as a bank, government agency or post office and the like;

(ii) An existing user 102 who conducts a one-hundred point check with a trusted source, as defined above ('the 100 point check");

(iii) In the event a user loses an authentication device 106, which had been used to by a user 102 to gain access via to a service which has a unique identifier against which the user 102 can be authenticated by any registered and trusted authentication device service; and (iv) In the event that a user 102 is unable to complete the Q&A process having forgotten their PIN and the answers to their own questions.

Each of these different approaches will now be described in more detail, (i) A New User To immediately achieve Trust Level 3 category, a user 102 would have to be registering themselves for a trusted online service, such as a bank, government agency or post office or the like.

The user 102 would visit the trusted service—for example a bank branch—and ask to be registered for their service.

The branch representative would then need to complete both a "100" point check and the authentication registration process.

The "100" point check is a standard process but could be graphically represented on an authentication management console to ensure the branch representative had completed all required steps. Having completed the "100" point check to verify the identity of the user—for which the trusted source would have to have an existing account relating to the individual, such as a bank account—the branch representative would then be able to register the user's authentication device 106 by following a registration process.

This would require the input of the acquired ("marked") authentication device 106 activation code and input of the service authentication code to enable a PIN to be selected. Having completed this process, the input could be digitally "signed" by the branch representative after which time the user 102 would then have access to the corresponding online service via their authentication device 106 with a Trust Level 3 status.

Having also been previously agreed between authentication device 106 and the trusted service provider, a unique identifier—such as cash card account number or similar—would have to be entered. This would be the secondary identifier, over and above the "100" point check, that would be required in the event the user 102 lost their authentication device 106, or forgot the answers to their personal questions and had to visit another trusted source to acquire a new device or to get their account reset (defined in iii and iv below).

The trusted source conducting the initial registration and providing the authentication device would also become the user's primary service provider.

ii) The "100" Point Check

In the event a registered authentication device user 102 wished to gain a Trust Level 3 status, they would need to visit an authentication device registered trusted source, such as a bank, government agency or post office etc.

If the trusted source had a service for which the user was already registered they would be able to complete the entire "100" point check process as they would be able to verify the "100" point check against the account the user had with the source. This could occur when a user 102 had already registered themselves previously online as a Trust Level 2 category and had subsequently visited the remote service provider in person to change their Trust Level category.

The representative would be able to access the user's authentication device account by means of the agreed service identifier (such as cash card number etc.) and/or the activation code of their authentication device. The authentication server would then outline all requirements by which to achieve the "100" point check.

The representative could then request the user successfully verify themselves to authentication device by providing a one time PIN based on their authentication device and a service authentication code issued by the authentication server. Having completed this process, the user would be registered as a Trust Level 3 user.

If the user 102 had visited a trusted source for which they do not have an account, the source could still conduct the "100" point check.

In such an event, the user 102 would provide a unique identifier, as detailed between authentication device 106 and the remote service 104 for which the user 102 has registered accounts. The representative could then log on to the authentication device management console and search for the appropriate service and verify that the information the user holds—such as cash card, driving license details etc., are those registered against the respective service. The authentication server 116 could then outline both the requirements for the 100 point check and also any other details that the remote service 104 against which they are checking would be required as having been sighted by the representative.

Having completed this step the representative could then request the user input their authentication device DPIN as a further means of verification and then verify the details by digitally signing the entry. The user would then obtain Trust Level 3 status.

iii) A Lost Device

In the event a user 102 loses their authentication device 106 they could either obtain another one from a trusted service for which they have registered the use of their authentication device 106 or they could visit another registered service—which would have to be a trusted source such as a bank or post office.

To re-enable them to their authentication device 106 enabled services, the representative providing the new authentication device 106 would have to conduct a "100" point check and also verify the user's unique identifier against their own databases—for which the user has registered their authentication device 106—or ensure the identifier matched that of another remote service 104 to which the user 102 was registered.

If the user 102 was acquiring the authentication device 106 from a trusted service for which they had registered use of their authentication device 106, the representative could perform the "100" point check and verify the unique service identity. However, the re-enabling process on the authentication device management console would simply require the new device's activation code to be submitted along with the unique identifier so that the authentication server 116 could transfer the user's details from their old authentication device 106 to the new one and subsequently cancel the original device.

Given the user 102 would only have lost their authentication device 106, they would also be asked to submit their user PIN as an added means of identification with the authentication server 116.

Given the user 102 would be re-enabling their authentication device 106 with a trusted service to which they had already registered their authentication device 106, the re-enablement could be immediate and the user 102 could effectively use the authentication device 106 to gain access to all services to which they had previously registered.

Additionally, having completed the necessary 100 point check the Trust Level category could be moved to Trust Level 3.

Additionally, if the authentication devices 106 were to be made available for sale via retail outlets, the user 102 would have already purchased their new authentication device 106 and thus the representative could use whatever authentication device 106 the user brought in. The authentication service would check when the activation code was entered to re-enable the user 102 to ensure the authentication device 106 was not already in use by someone else or had been deactivated, thus preventing lost or stolen devices from being re-used.

If the user 102 was to visit a trusted service for which they are not registered, the representative would conduct the "100" point check and verify the unique identifier of a service for which they have already registered. Given the user 102 would only have lost their authentication device 106, they would also be asked to submit their user PIN as an added means of identification with the authentication server.

They could then register and re-enable the authentication device.

iv) Unable to Complete Q&A

Where a user 102 is unable to complete their Q&A there would be a need for them to visit a registered authentication device trusted service.

Only the trusted service could conduct the "100" point check and verify the identity of the user 102 against the authentication service management console.

As with (iii) above (that is, a lost device), if the user 102 went to a trusted source which provided a service for which they had registered their authentication device 106, the representative could conduct the "100" point check and re-enable the authentication device 106 by using the authentication device's activation code, service authentication code and new PIN selection for the user.

If the user 102 went to a registered authentication device trusted source which provided an online service for which the user 102 had not registered, the trusted source could conduct the "100" point check and verify against a unique authentication device service identifier. Together, these would be sufficient to ensure the identity and relationship of the individual with the remote service for which they have provided identification. As a result, the user 102 could be re-enabled with their new device.

Additionally, when the user 102 logged on for the first time again, they would be requested to submit new questions and personal answers, given they would have forgotten them first time around.

EXAMPLE 6

Authentication Device Processing

The following examples explain various ways in which a user 102 can register their authentication device 106, through both primary and secondary services, and the processes they would typically need to follow in order to ensure the continued use of their authentication device 106. In an embodiment, such processes may include, but not be limited to:
1. Authentication Device Deployment;
2. Authentication Device Registration;
3. Multiple Device Registration; and
4. User acquirement of an Authentication Device;
Each of these processes will now be described in more detail.
1. Authentication Device Deployment:

This section outlines the manners by which a user could register, or obtain, an authentication device, according to the Trust Level category.

Trust Level 3:

As explained above, in an embodiment, the only manner in which a user 102 may obtain an immediate Trust Level 3 category would be to actually obtain their authentication device 106 through a personal presence at a trusted source, and following a "100" point check.

However, in addition to "picking up" a standard authentication device 106, the user 102 could also request that the authentication device 106 be provided to them in one of a number of ways, such as:

1. To be sent to a mobile device, such as a mobile phone. This would entail the user 102 providing their mobile phone details when registering themselves or when obtaining a new authentication device (having lost their previous one). When provided in this way the authentication device 106 will be provided as a "software device" which should be first "marked" for the user so that they may select their user PIN during registration. On receipt of the authentication device 106, via SMS or similar, the user 102 would already have a user PIN with which to log onto the authentication device 106; or
2. With regards to a user 102 wishing to download a new software device to another medium, such as a HP iPAQ handheld computer, the authentication device 106 may be delivered by a user 102 accessing a repository of downloadable software devices and by linking a newly registered authentication device 106 to that individual. A person assisting the user in registering their authentication device 106 in this manner could provide a link to the software device by means of the activation code, perhaps with a standard one time useable password, selected by the user. The user would also be able to select their authentication device PIN. When the user 102 subsequently logs onto the authentication server 116 using the activation code provided to them and the standard one time password they have selected, this would allow the user 102 to access to their software device, which they could then download to their HP iPAQ or similar medium. With the PIN already having been selected for this device, the user 102 is the only person that would be able to use the authentication device and the Trust Level 3 category would not have been broken.

Trust Level 2:

The following bullet points highlight how a user 102 would obtain an authentication device 106 under a Trust Level 2 relationship:

- The user 102 could be physically sent the authentication device in the mail after having requested the authentication device when they had logged onto the corresponding service using pre-existing credentials, such as a user ID and password. Similarly, the user 102 could request an authentication device 106 on the basis of unique pre-existing identification, such as credit card details, which would then only be mailed to the address held on the remote service's database for that individual;
- The user 102 could request a "software device" be sent to the user 102 via SMS, after having signed on to a service using pre-existing credentials or provided pre-existing identification criteria, such as credit card details; or
- The user 102 could request that an authentication device 106 be downloaded so that they could install it on a medium of their choice, such as a HP iPAQ.

In all instances defined above, the authentication service registration process would be the same as the user would be in possession of an authentication device, irrespective of the medium on which the authentication device is held.

Trust Level 1:

To acquire an authentication device 106 for a Trust Level 1 category there would not have to be any control, given that the authentication service would merely assume that the user 102 is who they say they are. Given the user could self-register, and input any personal details, this level of control merely prevents an account from being compromised, once it has been set up.

As detailed above, at any time, a user 102 could move from a Trust Level 1 category relationship to a Trust Level 2 category relationship by registering their authentication device using pre-existing credentials from a trusted source. Similarly, a user could also move to a Trust Level 3 category relationship by visiting a trusted source and completing the "100" point check.

Note that in all instances there would be nothing to prevent any user 102 purchasing an authentication device 106 from a retail outlet. However, the Trust Level relationship would depend upon the registration process.

It is also important to note that while a Trust Level 1 category relationship may exist, the remote service may deploy a secure means of authentication device distribution that would be worthy of an improved Trust Level user category. However, this would have to be agreed between the remote service providers as Trust Level 1 category relationships are predominantly based on self registration and trust. Therefore, the details provided by any user could be fraudulent and could not be relied upon for Trust Level 2 category classification. In essence, the only secure deployment for an increased Trust Level classification beyond Trust Level 1 category would have to be to achieve Trust Level 3 category.

In view of the above, it would inevitably be in the best interests of Trust Level 1 service providers to therefore leverage off authentication devices already issued by at least a Trust Level 2 category relationship.

2. Authentication Device Registration:

The following sections outline examples of registration processes that a user would follow during registration of their authentication device and the dependency on the user's Trust Level category.

Trust Level 3 Registration:

When a user 102 enters a trusted service provider, such as a bank or a post office, the user 102 will follow a standard registration process regardless of the authentication device 106 medium they eventually end up using. An example of this process is described as follows:

1. The user 102 would indicate their desire to access the online service of the trusted service provider. In this example we have used an online banking service;
2. The bank representative would complete a "100" point check and establish a positive link between the individual and the account that individual holds with the remote service provider. This link would be the unique identifier previously established between the authentication service and the bank;
3. The bank representative could then authenticate to the authentication service management and register the user by a number of different ways—depending on the authentication device medium selected by the user 102:
4. If the user 102 has selected to take a physical device, the bank representative would input the authentication device activation code and details of the unique identifier, which would subsequently be required in the event the user lost their authentication device. The user 102 would then be requested to input the service authentication code issued by the authentication server 116—to verify the physical device—and would then be requested to select a PIN. They would then be able to access the remote service as a Trust Level 3 user. Note that the first time they log on they would have to go through the Q&A process;
5. If the user 102 wished to have the authentication device 106 delivered to their mobile phone, the representative would need to link their mobile phone number to an activation code drawn from the authentication server. This would also enable the user to select their user PIN online, so that when the software device was subsequently delivered by the authentication server to their mobile phone, they would be able to log on using the user PIN they had selected. Note that they would also be prompted to complete the Q&A process;
6. If the user 102 wished to obtain their authentication device as a software device to install on their PDA or HP iPAQ etc., the bank representative would again draw an activation code which would be linked to the individual. As well as requesting them to input their user PIN the representative would also request for a one time standard password. This would be given to the user along with a note of their activation code so that when they logged on later they would be able to access the authentication device service to access and download their authentication device. Subsequently, the authentication device would only then work with the correct PIN selected by the user and they would be forced to complete the Q&A process.

Trust Level 2 Registration:

To register as a Trust Level 2 category user, one must assume that the user 102 could have obtained the authentication device 106 in any manner deemed possible, whether it was by mail, from a retail outlet, picked up from their service provider or the like. It is the manner in which the authentication device is then registered which determines the user's Trust Level 2 category.

The key to the Trust Level 2 category is that the user 102 would have already been given credentials deemed to be used only by them. For example, pre-existing credentials used for access to an Internet banking service or credit card details. It is important to note that such credentials would have been provided to the user under some controlled delivery mechanism. However, for the purposes of the authentication service, one cannot assume that the credentials fell into the right hands, although likely.

Upon registering the authentication device, the user 102 would have to either logon to a pre-existing Trust Level 2 service, such as an online banking service or ensure they have information considered unique to them, such as credit card details and the like.

Having either logged on or provided unique credentials, the particular Trust Level 2 category service could pass the user to the authentication server for registration.

The authentication server 116 would request for the user's device activation code whereupon it would return a service authentication code. This service authentication code has two purposes, namely to enable the user 102 to be sure they are communicating with the authentication service and to ensure the authentication device 106 is synchronised with the authentication server 116.

The user 102, having ensured they are communicating with the authentication service would then follow the standard registration process whereby they would select a PIN and complete the Q&A process. Upon completion of these tasks, the authentication service would return control to the remote service to which the user is registering their authentication device. The remote service 104 would then return the unique identifier against which future verification of the user could be made in the event they wish to change their Trust Level category or when they have lost their authentication device 106 or have been unable to answer their own Q&As.

Trust Level 1 Registration:

To register as a Trust Level 1 category user there is no need to establish whether the user 102 is who they say they are. For services which require self registration, such as an online auction website, there is no means by which to ensure the individual is who they say they are.

However, with the current threats enabling all accounts which utilize a simple user ID and password for transacting on the Internet to be compromised, the authentication service would ensure that such accounts are only accessed by one individual and their corresponding authentication device.

For the purposes of Trust Level 1 category self registration one must again assume that the user 102 could have obtained the authentication device in any manner deemed possible, whether it was by mail, from a retail outlet, picked up from their service provider or the like. It is the manner in which the authentication device is then registered which determines the user's Trust Level 1 category.

The key to Trust Level 1 category is that the user 102 would not have provided any previous means by which to ensure their integrity and thus their identity cannot be relied upon for transactions and services relating to Trust Level 2 or 3 categories.

Upon registering the authentication device 106, the user 102 would have to either logon to a pre-existing Trust Level 1 category service, such as an online auction website, by using the credentials they initially obtained during self registration Furthermore, this time they would also need to have a form of unique identification which the Trust Level 1 category service would consider all users would carry with them. The reason for this is to enable subsequent re-enablement and Trust Level category updates at a trusted source.

Having either logged on using old credentials or having completed a new user self registration process, the particular Trust Level 1 category service could pass the user 102 to the authentication server for registration.

The authentication server 116 would request for the user's device activation code whereupon it would return a service authentication code. This service authentication code has two purposes, namely to enable the user to be sure they are communicating with the authentication service and to ensure the authentication device is synchronised with the authentication server 116.

The user 102, having ensured they are communicating with the authentication service would then follow the standard registration process whereby they would select a PIN and complete the Q&A process. Upon completion of these tasks, the authentication service would return control to the remote service to which the user is registering their authentication device. The remote service 104 would then return the unique identifier against which future verification of the user could be made.

3. Multiple Device Registration:

Having already registered their authentication device against a Trust Level service relationship, the user 102 would then be able to benefit from using their authentication device 106 for all other services in the authentication service 'family'. However, the remote services 104 to which they would be able to register would be dependent on their existing Trust Level status and the means by which they authenticate themselves.

Trust Level 3 Status:

If the user 102 is already registered as a Trust Level 3 user they would be able to register for all services in the authentication service 'family'.

In all instances, the user 102 would be able to select registration by means of their authentication device 106. The remote service to which they wish to register could then request for their activation code and a call would be made to the authentication service to establish their Trust Level category. If the user was not a Trust Level 3 user, an alternative process would have to be followed (refer below).

Upon authenticating that the user 102 is a Trust Level 3 category user, the authentication server 116 could ensure they are the legitimate owner of the authentication device 106 by providing the service authentication code and requesting input of their user PIN. Successful completion of this step would enable authentication device 106 to return a code to the remote service to which the user 102 is trying to register to enable appropriate details to be completed which meet the requirements of that particular service.

Upon completion of the remote service's registration process, the remote service should then provide the unique identifier required for subsequent use by the authentication server to enable re-verification of the user in the event they have lost their authentication device or have been unable to answer their own questions.

While it is possible for a user to input fraudulent details at this point, given they are a Trust Level 3 category user, any future activity conducted using the authentication device could be traced back to the legitimate user.

Trust Level 2 Status:

Even if the user 102 is a Trust Level 2 category user they would still need to obtain credentials directly from the Trust Level 2 category service to which they intend to register or would need to already have unique credentials, such as a credit card.

If such details are sent in the mail, as may currently be the case, the user could then use these credentials to logon and then register their authentication device. If on the other hand the user decides to visit the remote service to which they intend to register they would be able to do this on site—as explained previously—and as a result their Trust Level status would change to Trust Level 3.

Assuming the user 102 has been sent credentials or already has pre-existing credentials for the Trust Level 2 service, they would be able to logon using such credentials and then request that they register their authentication device.

The remote service to which they wish to register could then request for their activation code and then pass control to the authentication server for registration to be complete. However, in this instance, the authentication server 116 would not follow the initial authentication device registration process because having established the user is already registered they would only need to verify their identity by providing the service authentication code and verification of the user's PIN.

The authentication server 116 could then return a successful code to the Trust Level 2 category service which would then provide the unique identifier required for subsequent use by the authentication server 116 to enable re-verification of the user 102 in the event they have lost their authentication device or have been unable to answer their own questions.

Trust Level 1 Status:

For registering a device to a Trust Level 1 category service the user 102 could use pre-existing self registration credentials they may already have or could complete the remote service's self registration process. Either way, the user 102 would indicate that they wish to register their authentication device 106 to the remote service 104. All this would do is limit the fact that the account could not be compromised by current threats and would limit use of the account to the person against which the authentication device is being registered.

The remote service 104 to which they wish to register could then request for their activation code and then pass control to the authentication server 116 for registration to be complete. However, in this instance, the authentication server 116 would not follow the initial authentication device registration process because having established the user is already registered they would only need to verify their identity by providing the service authentication code and verification of the user's PIN.

The authentication server 116 could then return a successful code to the Trust Level 1 category service which would then provide the unique identifier required for subsequent use by the authentication server 116 to enable re-verification of the user 102 in the event they have lost their authentication device 106 or have been unable to answer their own questions.

User Acquirement of an Authentication Device:

In an embodiment, there are two primary means by which authentication devices 106 can be acquired or obtained by a user 102, namely:

1. A "physical" authentication device—a physical device would require capital expenditure by whoever decided to provide them. This could be any of the Trust Level services in the authentication service 'family' or any retail outlet wishing to make such devices available to the public; and
2. A "software" authentication device—a software device may be made available as a download from the authentication server 116 or as a download from the corresponding service. Using this means of device would mean capital expenditure would not be immediate but spread out over the duration of time it would take for users to request for their software device.

EXAMPLE 7

Authentication Device Linkage to an Existing Process

An authentication device 106 could be linked to an existing process via the use of existing services such as "Verified by Visa" or "MasterCard SecureCode".

In the event a user 102 wishes to register their authentication device 106 for use with such a service, the user 102 would be able to access the remote service as is currently the practice, based on the fact that they would have Trust Level 2 credentials.

Currently, these services are based on Trust Level 2 credentials available on the credit card. However, if the user 102 was to register their authentication device 106 as an additional step, the remote service 104 could then make the process available as a means of payment as opposed to having to input a static password online.

Whilst services such as "Verified by Visa" and "MasterCard SecureCode" have been introduced to avoid the need to input credit card details online, services of this type are still susceptible to "phishing" and/or keystroke logging in order to gain a user's password, and thereby the ability to fraudulently transact online payments.

Thus, a remote service would be able to provide a user's credit card details to the authentication device as the unique identifier. When the user 102 selects to use authentication device 106 to pay, the remote service 104 would call the authentication server 116 which would then authenticate the payment by means of the one time user PIN.

In view of the above, it will be recognised that the present invention provides an authentication method and device that is applicable to assist a user 102 to verify that he or she is communicating with the remote service and/or entity which they believe they are transacting with. This represents an anti-ghosting and anti-social engineering feature as current threats allow users to be 'fooled' into divulging their personal credentials through ghost websites, 'phishing' and fraudsters perpetrating to be the legitimate entity the user believes they are communicating with.

In addition, by providing a unique one time service authentication code to the user 102, the remote service 104 and/or entity is effectively authenticating itself to the user before any business is transacted online.

In view of the foregoing description, it will be appreciated that an authentication method and/or device according to an embodiment of the invention provides a tri-factor authentication method and/or device in that the following unique steps must be completed successfully for authentication and/or verification of a user's identity to be confirmed.

1. Provision of a valid authentication service code from the remote service 104, or other entity, which the user 102 is wishing to verify their identity. In an embodiment, this will enable the authentication device 106 to operate and an invalid authentication service code will render the authentication device 106 inoperable;
2. The user 102 entering their own unique user PIN into the authentication device 106 which will then be encoded by the authentication device 106 and displayed for input or relayed back to the remote service 104, or other entity, to whom the user 102 is authenticating; and
3. Input of the encoded user PIN to the remote service and/or entity.

Additionally, an authentication device 106 according to an embodiment of the invention can be provided in software form for installation on a mobile phone, PDA or similar, depending on user choice.

Advantageously, an authentication device 106 according to an embodiment of the invention does not have to be 'seeded' prior to dispatch as the user is able to activate the authentication device at the point of registration and the authentication device remains useless until registered with pre-existing credentials provided by the remote service to which they are registering the authentication device.

As previously described, the authentication device may enable simple integration with multiple verification and authentication processes that currently exist and which would otherwise require multiple devices to be deployed. Through a simple registration process a user would only have to carry a single authentication device in order to conduct many functions which require security and which are currently questionable, such as telephone banking, online purchasing, manual identity and paper cheque verification and the like.

In addition, an authentication device product may allow progressive identity based on trust relationships which are driven by pre-existing authentication processes. In particular, the identity of users could be a progressive process rather than that of being immediate. It is envisaged that such a process could provide significant economical benefits to offset the current inhibitors to such change which require immediate verification of a user's identity in order for alternative products to work.

As previously described, the Q&A feature, as provided in an embodiment of the invention, is supplemented by the fact that a user would not be able to access their Q&A unless they were in physical possession of their authentication device. Thus, the means by which access to the questions is obtained further improves the security of an embodiment of the invention, as without the authentication device, the user would not be able to complete the Q&A process.

It is also envisaged that an authentication server may also enable users to determine at which hours their authentication device can be used and thus provide virtual and unique opening hours for each user. Thus, in one embodiment, a user may determine the "opening hours" during which time the authentication device can be used. According to this embodiment, outside these times it would not be possible to logon. In the event the user wishes to change the times, they would have to wait until their pre-defined opening hours to do so. Thus, complete control rests with the user.

EXAMPLE 8

Authentication of a Remote Service Sending a Communication

Figure 7:
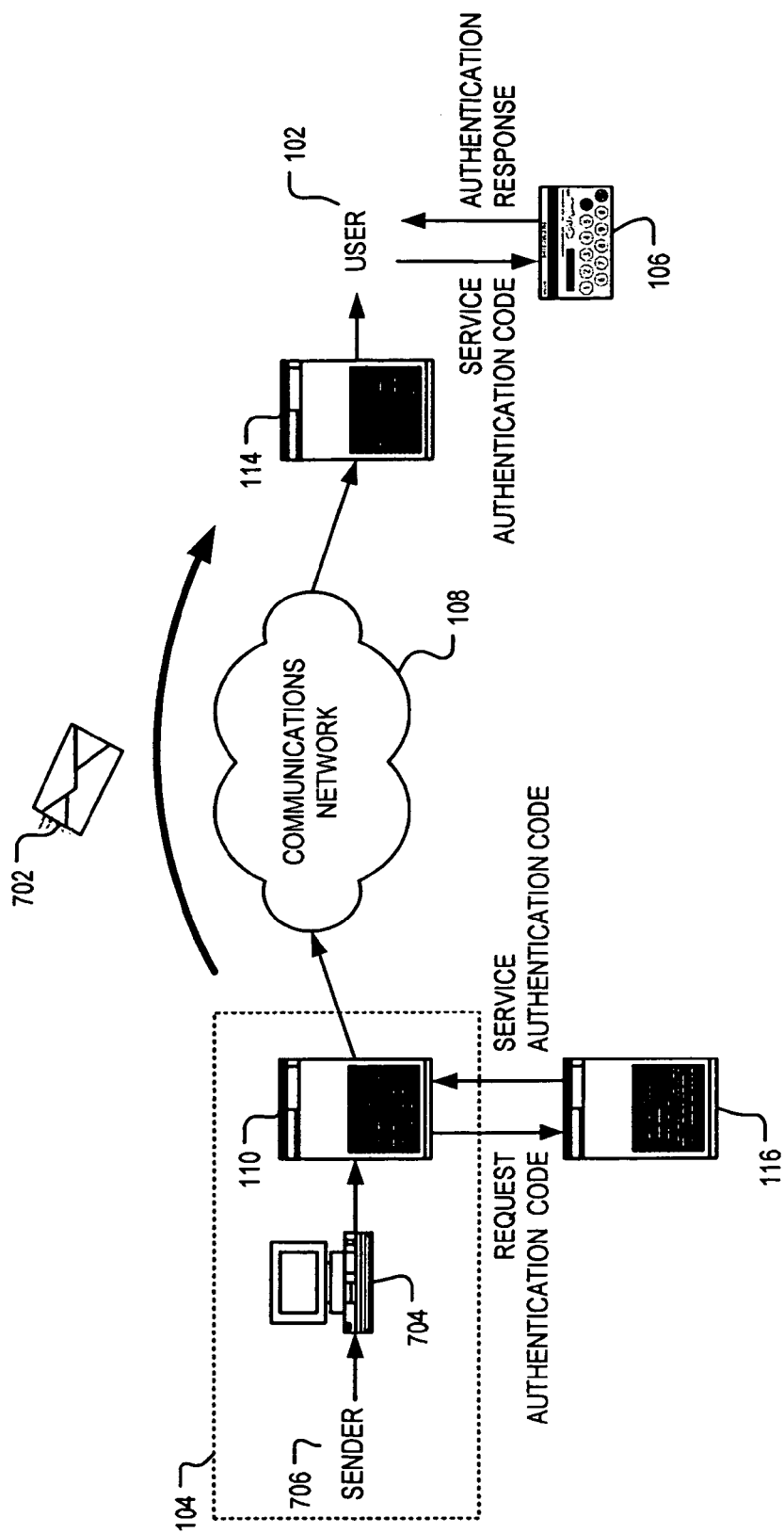
FIG. 7 is a block diagram of a system for authenticating a sender of an electronic message in accordance with an embodiment of the present invention.

FIG. 7 depicts an example application of a system 700 in accordance with another embodiment of the present invention. In this example, the system 700 permits a user 102 to use an authentication device 106 to verify, by way of an authentication process, that an electronic communication 702 originated from a remote service 104. In other words, the illustrated example depicts an example application of a system 700 according to an embodiment of the present invention that allows a user 102 to authenticate that the remote service 104 identified in (or by) the electronic communication 702 is the legitimate source of the electronic communication 702. The electronic communication 702 may include a voice communication, such as telephone communication; or a data communication, such as an email, a short message service (SMS) message, a multi-media service (MMS) message, an electronic file, an instant message sent to an instant messaging client associated with the user, a text message, or a facsimile. In the example depicted in FIG. 7, the electronic communication 702 is an email message that has been constructed by the sender 706. Thus, in the present case, the user device 114 and the network device 110 will each be a communications device capable of communicating email messages. Of course, the type and capability of the user device 114 and the network device 110 will vary according to the type of electronic communication 702.

A method embodiment for authenticating the remote service 104 identified in the electronic communication 702 is similar to that explained above with reference to FIG. 3, except that in this example, and as briefly described earlier, the service authentication code is embedded in the electronic communication 702. In addition, in this example the service authentication code is communicated to the user 102 together with other information, comprising a message, contained in the electronic communication 702.

Figure 8:
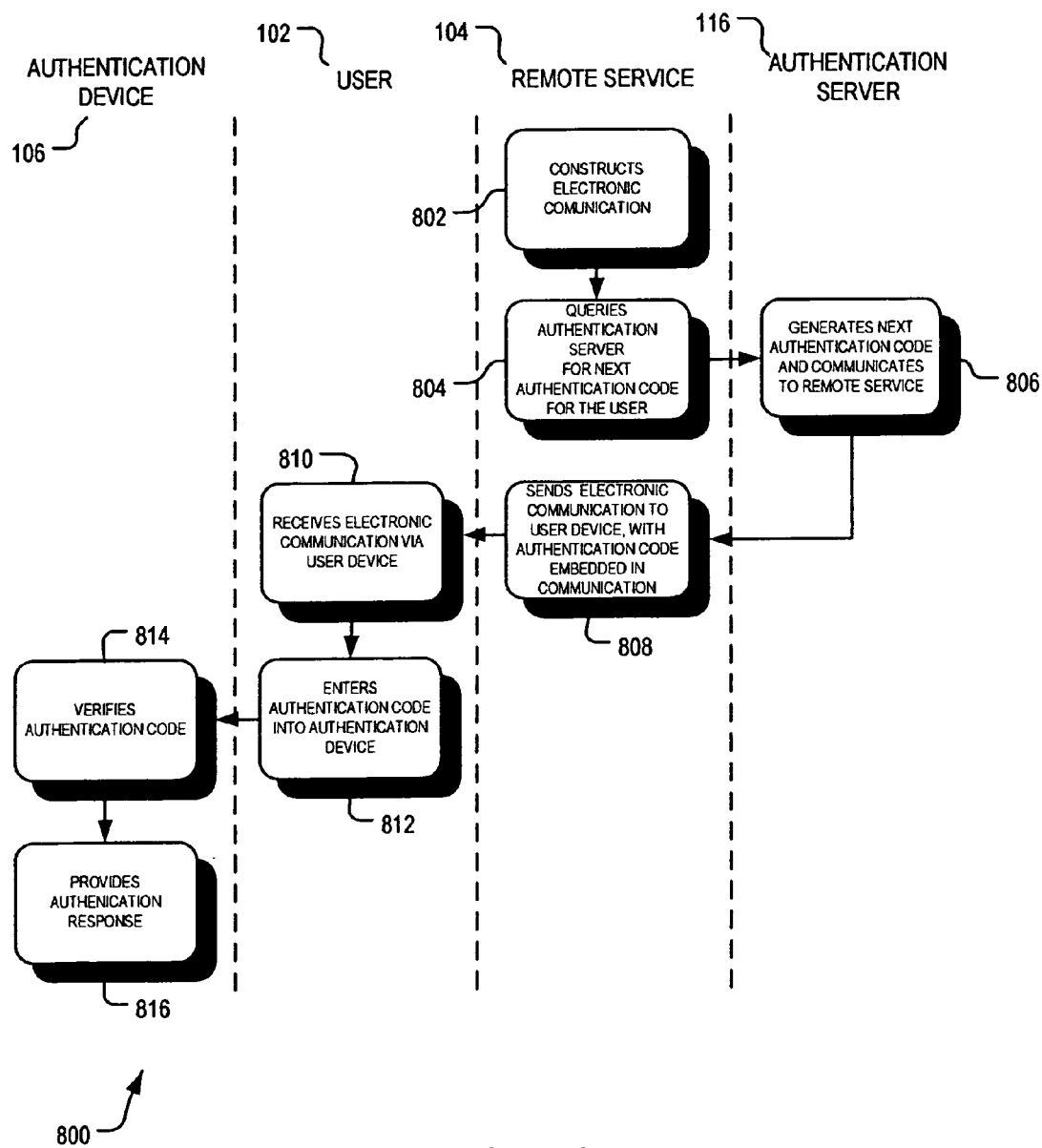
FIG. 8 is a flow diagram that describes the steps in a method in accordance with an embodiment of the present invention for authenticating a remote service identified in an electronic communication.

FIG. 8 depicts a flow diagram of an embodiment of a method 800 of authenticating a remote service 104 identified in an electronic communication 702. As shown, the method includes a step 802 of the remote service 104 constructing the electronic communication 702 for communication to the user 102. In the present example, the electronic communication 702 is constructed by a sender 706 using a computing device 704 connected to the network device 110. In this example, the computing device 704 is a desktop computer installed with a suitable operating system and email software and the network device 110 is a network server.

At step 804, the remote service 104 requests a service authentication code from the authentication server 116. The request includes information identifying the user 102 to which the sender 706 (ref. FIG. 7), and thus the remote service 104, wishes to send the electronic communication 702. In this respect, although in the example depicted in FIG. 7 the authentication server 116 is shown as separate from the remote service 104 architecture, it is to be understood that the authentication server 116, or the functionality provided by the authentication server 116, could be integrated within the remote service architecture 104 (shown here as being bounded by a dashed box).

In response to the request, the authentication server 116 generates, at step 806, a service authentication code in accordance with the method described previously.

At step 808, the service authentication code is embedded into the electronic communication 702 and communicated to the user 102 via the communications network 108.

At step 810 the service authentication code is received by the user 102 via the user device 114 and, at step 812, entered into the authentication device 106 associated with the user 102.

At step 814, the authentication device 106 verifies the service authentication code, using the previously described method, by generating an expected service authentication code value and thereafter comparing the expected code value to the service authentication code.

Finally, at step 816, and responsive to the comparison, and in the event that the expected code correlates with the service authentication code, the authentication device 106 generates a response that indicates to the user 102 the authenticity of the remote service 104.

Finally, it will be understood that there may be other variations and modifications to the configurations described herein that are also within the scope of the present invention.

The invention claimed is:

1. A method of providing to a user information to enable the user to know that a remote service to which the user connects via a communications network is in fact the service that it represents itself to be as opposed to an imitator of such service, the method including:

the remote service obtaining a service authentication code that has been generated, using a code generation algorithm, based on a first secret key;

communicating the service authentication code to the user via the communications network;

entering the service authentication code into an authentication device in the control of the user;

generating in the authentication device, using the same code generation algorithm, an expected code value based on a second secret key, then comparing the expected code value to the service authentication code received from the remote service; and if the expected code value correlates correctly with the service authentication code, the authentication device generating a response that indicates to the user that the remote service is the remote service that it represents itself to be, as opposed to an imitator of such service.

2. A method according to claim 1 wherein the remote service includes an electronic commerce service.

3. A method according to claim 1 wherein the electronic commerce service includes an internet commerce service.

4. A method according to claim 1 wherein the service authentication code is generated by an authentication server communicatively coupled to a server hosting the remote service.

5. A method according to claim 1 wherein the first secret key is retrieved by indexing a user provided code into a database containing a code for each authentication device that has been registered for accessing the remote service, and the first secret key associated therewith, so as to retrieve the first secret key associated with the user provided code.

6. A method according to claim 5 wherein the user provided code uniquely identifies the authentication device.

7. A method according to claim 1 wherein the generation of the service authentication code includes encoding the first secret key to provide a one-time usable authentication code.

8. A method according to claim 7 wherein each instance of the code generation algorithm uses a first pseudorandom encoding sequence and a second pseudorandom encoding sequence, the second pseudorandom encoding sequence having the same sequence length as the first pseudorandom encoding sequence.

9. A method according to claim 8 wherein the first pseudorandom encoding sequence includes a sequence of singularly occurring characters forming a character set from which the first secret key is derived so that the first pseudorandom encoding sequence includes the characters of the first secret key.

10. A method according to claim 8 wherein the second pseudorandom encoding sequence includes an arrangement of characters from a different character set to the first secret key.

11. A method according to claim 8 wherein the code generation algorithm for generating the service authentication code or the expected value respectively includes:

identifying, in order, the location of characters in the first pseudorandom encoding sequence corresponding to the characters of the first secret key or the second secret key;

mapping the location of the identified characters in the first pseudorandom encoding sequence to characters of the second pseudorandom encoding sequence having the same sequence location to provide a set of characters from the second pseudorandom encoding sequence; and arranging, in the order of identification, the set of characters of second pseudorandom encoding sequence so as to form the service authentication code.

12. A method according to claim 8 wherein different first and second pseudorandom encoding sequences are used whenever a service authentication code is generated to reduce the likelihood of the same service authentication code being regenerated.

13. A method according to claim 1 wherein the response includes the authentication device activating to generate a user authentication code for authenticating the user to the remote service.

14. A method according to claim 1 wherein the second secret key is stored in memory on-board the authentication device so as to be normally inaccessible to the user.

15. A method according to claim 1 wherein the service authentication code includes an identifier for synchronising the code generation algorithm for generating the service authentication code with the code generation algorithm for generating the expected code value.

16. A method according to claim 1 wherein the code generation algorithm for generating the service authentication code based on the first secret key, and the code generation algorithm for generating the expected code value based on the second secret key, use synchronised encoding sequences for generating the service authentication code and the expected code value based on the first secret key and the second secret key respectively.

17. A method according to claim 16 wherein the encoding sequences are modified each time a service authentication code is generated.

18. A method of authenticating a remote service to a user via a communications network whereby the remote service is able to demonstrate to the user that the remote service is the service it purports to be, the method including:

the remote service obtaining a service authentication code that has been generated using a code generation algorithm based on a first secret key;

communicating the service authentication code to the user via the communications network;

entering the service authentication code into an authentication device in the possession of the user;

the authentication device generating, using the same code generation algorithm, an expected code value based on a second secret key, the authentication device thereafter comparing the expected code value to the service authentication code; and if the expected code value correlates correctly with the service authentication code, the authentication device generating a response that indicates to the user that the remote service is the service it purports to be;

wherein the code generation algorithm for generating the service authentication code based on the first secret key, and the code generation algorithm for generating the expected code value based on the second secret key use synchronised encoding sequences for generating the service authentication code and the expected code value, based on the first secret key and the second secret key, respectively.

19. A method of mutually demonstrating over a communications network to a user and to a remote service that each of the remote service and the user are who they purport to be, the method comprising:

the remote service obtaining a service authentication code that has been generated, using a code generation algorithm, based on a first secret key;

communicating the service authentication code to the user via the communications network;

entering the service authentication code into an authentication device in control of the user;

generating in the authentication device, using the same code generation algorithm as in the remote service, an expected code value based on a second secret key, and thereafter comparing the expected code value to the service authentication code;

if the expected code correlates with the service authentication code, the authentication device generating, using a code generation algorithm, a user authentication code value based on a third secret key;

communicating the user authentication code to the remote service via the communications network;

the remote service obtaining a second expected code value that has been generated based on a fourth secret key and thereafter comparing the second expected code value to the user authentication code; and if the second expected code value correlates with the user authentication code, the remote service allowing the user further access to the remote service.

20. A software architecture embodied on at least one non-transitory computer-readable media for implementation on a server to enable a service to demonstrate to a user communicating with that service that the service is the service it purports to be, the software architecture including:

a service authentication code generator for generating a service authentication code, using a code generation algorithm, based on a first secret key, the generation of the service authentication code including encoding the first secret key using a first pseudorandom encoding sequence and a second pseudorandom encoding sequence having the same sequence length as the first pseudorandom encoding sequence, the encoding including:

identifying, in order, the location of characters in the first pseudorandom encoding sequence that correspond to the characters of the first secret key;

mapping the sequence location of the identified characters to characters of the second pseudorandom encoding sequence having the same sequence location to provide a set of characters from the second pseudorandom encoding sequence; and arranging, in order of identification, the set of characters of the second pseudorandom encoding sequence to form the service authentication code; and a communication driver for communicating the service authentication code to a remote user via the communications network;

wherein the service authentication code varies according to the first and a second pseudorandom encoding sequences used by the code generation algorithm and wherein a different first and second pseudorandom encoding sequence is used whenever a service authentication code is generated to reduce the likelihood of the same service authentication code being regenerated.

21. A software architecture embodied on at least one non-transitory computer-readable media for implementation on an authentication device, the software architecture including:

an input driver for receiving or entering a service authentication code provided by a remote service, the service authentication code having been generated using a code generation algorithm, based on a first secret key;

a generator for generating, using the code generation algorithm, an expected code value based on a second secret key;

a comparator for comparing the expected code value to the service authentication code; and a response generator for generating a response indicative of the authenticity of the remote service according to a comparison of the expected code with the service authentication code.

22. An authentication device for providing a response that indicates to a user of the device that a remote service with which the user wishes to communicate over a communications network is, in fact, the remote service with which the user desires to interact, as opposed to an imitator of such remote service, the authenticity of a remote service based on an service authentication code provided by the remote service, the authentication device including:

an input device for receiving or entering the service authentication code, the service authentication code having been generated using a code generation algorithm based on a first secret key;

a code generator circuit for generating, using the same code generation algorithm, an expected code value based on a second secret key;

a comparator circuit for comparing the expected code value to the service authentication code; and a response generator for generating a response indicative of the authenticity of the remote service according to a comparison matching the expected code with the service authentication code, and thereby indicate to the user that the remote service is, in fact, the remote service with which the user desires to interact, as opposed to an imitator of such remote service.

23. A device according to claim 22 wherein each code generation algorithm uses a first pseudorandom encoding sequence and a second pseudorandom encoding sequence, the second pseudorandom encoding sequence having the same sequence length as the first pseudorandom encoding sequence.

24. A device according to claim 23 wherein the first pseudorandom encoding sequence includes a sequence of singularly occurring characters forming a character set from which the first secret key is derived so that the first pseudorandom encoding sequence includes the characters of the first secret key.

25. A device according to claim 23 wherein the second pseudorandom encoding sequence includes an arrangement of characters from the same or different character set to the first secret key.

26. A device according to claim 23 wherein the code generation algorithm for generating the expected value respectively includes:

identifying, in order, the location of characters in the first pseudorandom encoding sequence corresponding to the characters of the second secret key;

mapping the location of the identified characters in the first pseudorandom encoding sequence to characters of the second pseudorandom encoding sequence having the same sequence location to provide a set of characters from the second pseudorandom encoding sequence; and arranging, in the order of identification, the set of characters of second pseudorandom encoding sequence so as to form the service authentication code.

27. A device according to claim 23 wherein different first and second pseudorandom encoding sequences are used whenever a service authentication code is generated to reduce the likelihood of the same service authentication code being regenerated.

28. A device according to claim 22 wherein the response includes the authentication device activating for generating a user authentication code for authenticating the user to the remote service.

29. A device according to claim 22 wherein the second secret key is stored in memory on-board the authentication device so as to be normally inaccessible to the user.

30. A device according to claim 22 wherein the service authentication code includes an identifier for synchronising the code generation algorithm for generating the service authentication code with the code generation algorithm for generating the expected code value.

31. A device according to claim 22 wherein the code generation algorithm for generating the service authentication code based on the first secret key, and the code generation algorithm for generating the expected code value based on the second secret key, use synchronised encoding sequences for generating the service authentication code and the expected code value based on the first secret key and the second secret key respectively.

32. A device according to claim 31 wherein the encoding sequences are modified each time a service authentication code is generated.

33. A method of authenticating a remote service to a user via a communications network, the authentication demonstrating to the user that the remote service is actually the remote service with which the user wishes to interact, as opposed to a different remote service, the method including:
   a user operating an authentication device to retrieve, from the device, a unique identification code associated therewith;
   the user sending the unique identification code to the remote service via a communications network;
   the remote service obtaining a service authentication code that has been generated using a code generation algorithm based on a first secret key, the first secret key being retrieved from a database by indexing the unique identification code into the database, the database including identification codes for authentication devices that have been registered for accessing the remote service;
   communicating the service authentication code to the user via the communications network;
   entering the service authentication code into an authentication device associated with the user;
   the authentication device generating, using the same code generation algorithm, an expected code value based on a second secret key, and thereafter comparing the expected code value to the service authentication code; and
   responsive to the comparison, and when the expected code value correctly correlates with the service authentication code, the authentication device generating a response that indicates to the user the authenticity of the remote service.

34. A method of confirming the authenticity of a second user to a first user using a remote service via a communications network, the method including:
   the first user authenticating the remote service using a method according to claim 1;
   in the event that remote service is validly authenticated, the first user providing a user authentication code generated by an authentication device of the second user based on a secret key associated with, or provided by, the second user;
   communicating the user authentication code to the remote service via the communications network;
   the remote service obtaining an expected code value that has been generated based on a secret key and thereafter comparing the expected code value to the user authentication code for a second user; and
   responsive to the comparison and in the event that the expected code correlates with the user authentication code, the remote service providing a response to the first user that indicates the authenticity of the second user.

35. A method of creating an authenticating device comprising:
   a user accessing a service hosting a software program for installation on an electronic device to create a software architecture according to claim 21;
   the service communicating the software program to the portable electronic device; and
   executing, or installing, the software program to create the software architecture on the portable electronic device.

36. A method according to claim 35 wherein the software architecture is communicated via:
   (a) a short message service;
   (b) an electronic mail service; or
   (c) a packet based communications service.

* * * * *